United States Patent
Lucas et al.

(10) Patent No.: US 11,561,774 B2
(45) Date of Patent: *Jan. 24, 2023

(54) COMPOSITION OF PATTERN-DRIVEN REACTIONS IN REAL-TIME DATAFLOW PROGRAMMING

(71) Applicant: JOHNSON CONTROLS TYCO IP HOLDINGS LLP, Milwaukee, WI (US)

(72) Inventors: Jason Lucas, Renton, WA (US); Abhishek Sharma, Mountain View, CA (US)

(73) Assignee: JOHNSON CONTROLS TYCO IP HOLDINGS LLP, Milwaukee, WI (US)

(*) Notice: Subject to any disclaimer, the term of this patent is extended or adjusted under 35 U.S.C. 154(b) by 198 days.

This patent is subject to a terminal disclaimer.

(21) Appl. No.: 16/792,149

(22) Filed: Feb. 14, 2020

(65) Prior Publication Data

US 2020/0183660 A1    Jun. 11, 2020

Related U.S. Application Data

(63) Continuation of application No. 15/467,313, filed on Mar. 23, 2017, now Pat. No. 10,564,941.

(Continued)

(51) Int. Cl.
*G06F 8/35* (2018.01)
*G06F 8/30* (2018.01)
(Continued)

(52) U.S. Cl.
CPC .................. *G06F 8/35* (2013.01); *G06F 8/31* (2013.01); *G06F 8/34* (2013.01); *G06F 8/40* (2013.01);
(Continued)

(58) Field of Classification Search
CPC ..... G06F 8/35; G06F 8/31; G06F 8/34; G06F 8/40; G06F 9/4498; G06F 11/3668; G06F 11/3664; G06F 16/9535
(Continued)

(56) References Cited

U.S. PATENT DOCUMENTS 3,979,733 A * 9/1976 Fraser .................. H04L 12/56
710/316
4,975,865 A    12/1990 Carrette et al.
(Continued)

FOREIGN PATENT DOCUMENTS

CN    101860978    10/2010
CN    103024059    4/2013
(Continued)

OTHER PUBLICATIONS

Title: Streaming model transformations by complex event processing, author: I David, published on 2014.*
(Continued)

*Primary Examiner* — Chameli Das
(74) *Attorney, Agent, or Firm* — Foley & Lardner LLP

(57) ABSTRACT

A technique implements a dataflow graph, taking a number of streams of data inputs and transforms these inputs into a number of streams of outputs. The dataflow graph can perform pattern matching. The technique implements reactions via the composition of pattern matching across joined streams of input data. A completeness of matching an input sequence to a particular input pattern can be characterized as having at least three different degrees, such as cold (not yet matched), warm (e.g., minimally matched), and hot (e.g., maximally matched). The input pattern to be matched can have a variable length, including zero length or unlimited or
(Continued)

arbitrarily large length. Data flows can be on a push basis or pull basis, or a combination, and may change depending on the state.

28 Claims, 11 Drawing Sheets

Related U.S. Application Data

(60) Provisional application No. 62/312,255, filed on Mar. 23, 2016, provisional application No. 62/312,223, filed on Mar. 23, 2016, provisional application No. 62/312,187, filed on Mar. 23, 2016, provisional application No. 62/312,106, filed on Mar. 23, 2016.

(51) Int. Cl.
*G06F 8/34* (2018.01)
*G06F 8/40* (2018.01)
*G06F 11/36* (2006.01)
*G06F 16/9535* (2019.01)
*G06F 9/448* (2018.01)
*G06F 9/48* (2006.01)

(52) U.S. Cl.
CPC ............. *G06F 9/4498* (2018.02); *G06F 9/48* (2013.01); *G06F 11/3664* (2013.01); *G06F 11/3668* (2013.01); *G06F 16/9535* (2019.01)

(58) Field of Classification Search
USPC .......................................... 707/754; 717/153
See application file for complete search history.

(56) References Cited

U.S. PATENT DOCUMENTS

| | | | | |
|---|---|---|---|---|
| 5,181,025 A * | 1/1993 | Ferguson | ............. | H01Q 9/0407 343/700 MS |
| 6,725,287 B1 | 4/2004 | Loeb et al. | | |
| 6,826,756 B1 * | 11/2004 | Herrod | .................... | G06F 9/451 719/310 |
| 7,065,525 B1 * | 6/2006 | Sasaki | .................. | G06F 16/955 369/13.01 |
| 7,590,644 B2 * | 9/2009 | Matsakis | .................... | G06F 8/41 715/239 |
| 8,572,155 B2 | 10/2013 | Yanovich et al. | | |
| 10,310,896 B1 * | 6/2019 | Kichak | ................. | G06F 9/4843 |
| 10,331,495 B2 * | 6/2019 | Bequet | ............. | G06F 16/90344 |
| 11,438,392 B1 * | 9/2022 | Watanabe | ............... | H04L 65/61 |
| 2003/0035582 A1 | 2/2003 | Linhart | | |
| 2007/0011334 A1 * | 1/2007 | Higgins | ............. | G06F 11/3604 709/227 |
| 2007/0250299 A1 | 10/2007 | Paxson et al. | | |
| 2008/0134158 A1 | 6/2008 | Salz et al. | | |
| 2009/0106011 A1 | 4/2009 | Chen et al. | | |
| 2011/0004863 A1 | 1/2011 | Feblowitz et al. | | |
| 2013/0110745 A1 | 5/2013 | Zhang | | |
| 2013/0144814 A1 | 6/2013 | Klinger et al. | | |
| 2014/0047107 A1 | 2/2014 | Maturana et al. | | |
| 2014/0282227 A1 | 9/2014 | Nixon et al. | | |
| 2014/0359552 A1 | 12/2014 | Misra et al. | | |
| 2015/0161214 A1 | 6/2015 | Kali et al. | | |
| 2015/0381712 A1 | 12/2015 | De Castro et al. | | |
| 2017/0060726 A1 * | 3/2017 | Glistvain | .............. | G06F 11/362 |
| 2017/0085445 A1 | 3/2017 | Layman et al. | | |
| 2021/0382449 A1 | 12/2021 | Krishnan et al. | | |
| 2021/0382451 A1 | 12/2021 | Bharathi et al. | | |
| 2021/0382452 A1 | 12/2021 | Krishnan et al. | | |
| 2021/0382474 A1 | 12/2021 | Krishnan et al. | | |
| 2021/0389968 A1 | 12/2021 | Majewski et al. | | |
| 2022/0004445 A1 | 1/2022 | George et al. | | |

FOREIGN PATENT DOCUMENTS

| | | |
|---|---|---|
| CN | 103200249 | 7/2013 |
| KR | 10-1468546 B1 | 12/2014 |
| KR | 20150049763 A | 5/2015 |

OTHER PUBLICATIONS

Title: Authoring sensor-based interactions by demonstration with direct manipulation and pattern recognition author: B Hartmann, published on 2007.*
Title: Comparing sensor modalities for activity recognition, author: Y Sahaf; published on 2011.*
Title: Rapid prototyping of activity recognition applications author: D Bannach, published on 2008.*
Title: A dynamical systems perspective on agent-environment interaction, author: RD Beer, published on 1995.*
Privat et al. Edge-of-Cloud Fast-Data Consolidation for the Internet of Things, 19th International ICIN Conference—Innovations in Clouds, Internet and Networks—Mar. 1-3, 2016, pp. 226-233. (Source: http://dl.ifip.org/db/conf/icin/icin2016/1570229504.pdf).
International Search Report, PCT Application PCT/US2017/023911, dated Jul. 13, 2017, 3 pages.
Mohammad Aazam, Eui-Nam Huh, Fog Computing and Smart Gateway Based Communication for Cloud of Things, 2014 International Conference on Future Internet of Things and Cloud, Aug. 31, 2014, pp. 464-470, IEEE, https://pdfs.semanticscholar.org/aa8a/6894735dc32aa7212ab7606ccd6d6e7338b9.pdf.
European Patent Office, Extended European Search Report, EP Application No. 17771200.7, dated Nov. 14, 2019, 9 pages.
European Office Action on EP Appl. No. 17771200.7 dated Sep. 10, 2021 (2 pages).
Korean Grant of Patent on KR Appl. No. 10-2018-7030472 dated Dec. 19, 2019 (4 pages with English language translation).
European Office Action on EP Appl. No. 17771200.7 dated Nov. 25, 2022 (5 pages).

* cited by examiner

COMPOSITION OF PATTERN-DRIVEN REACTIONS IN REAL-TIME DATAFLOW PROGRAMMING

CROSS-REFERENCE TO RELATED APPLICATIONS

This patent application is a continuation of U.S. patent application Ser. No. 15/467,313, filed Mar. 23, 2017, issued as U.S. Pat. No. 10,564,941 on Feb. 18, 2020, which claims the benefit of U.S. patent applications Nos. 62/312,106, 62/312,187, 62/312,223, and 62/312,255, filed Mar. 23, 2016. These applications are incorporated by reference along with all other references cited in this application.

BACKGROUND OF THE INVENTION

The invention relates to the field of computing, and more specifically to composition of pattern-driven reactions in real-time dataflow programming, which may be used edge computing to handle the large amounts of data generated by industrial machines.

Traditional enterprise software application hosting has relied on datacenter or "cloud" infrastructure to exploit economies of scale and system efficiencies. However, these datacenters can be arbitrarily distant from the points of physical operations (e.g., factories, warehouses, retail stores, and others), where the enterprise conducts most of its business operations. The industrial Internet of things (IIoT) refers to a collection of devices or use-cases that relies on instrumentation of the physical operations with sensors that track events with very high frequency.

Industrial machines in many sectors com under this Internet of things (IoT) including manufacturing, oil and gas, mining, transportation, power and water, renewable energy, health care, retail, smart buildings, smart cities, and connected vehicles. Despite the success of cloud computing, there are number of shortcomings: It is not practical to send all of that data to cloud storage because connectivity may not always be there, bandwidth is not enough, variation in latencies is too high, or it is cost prohibitive even if bandwidth exists. Even if connectivity, bandwidth, and cost are not issues, there is no real-time decision making and predictive maintenance that can result in significant damage to the machines.

Therefore, improved computing systems, architectures, and techniques including improved edge analytics and dataflow programming are needed to handle the large amounts of data generated by industrial machines.

BRIEF SUMMARY OF THE INVENTION

A technique implements a dataflow graph, taking a number of streams of data inputs and transforms these inputs into a number of streams of outputs. The dataflow graph can perform pattern matching. The technique implements reactions via the composition of pattern matching across joined streams of input data. A completeness of matching an input sequence to a particular input pattern can be characterized as having at least three different degrees, such as cold (not yet matched), warm (e.g., minimally matched), and hot (e.g., maximally matched). The input pattern to be matched can have a variable length, including zero length or unlimited or arbitrarily large length. Data flows can be on a push basis or pull basis, or a combination, and may change depending on the state.

In a specific implementation, the dataflow programming technique is used in an edge computing system. A method enables intelligence at the edge. Features include: triggering by sensor data in a software layer hosted on either a gateway device or an embedded system. Software layer is connected to a local-area network. A repository of services, applications, and data processing engines is made accessible by the software layer. Matching the sensor data with semantic descriptions of occurrence of specific conditions through an expression language made available by the software layer. Automatic discovery of pattern events by continuously executing expressions. Intelligently composing services and applications across the gateway device and embedded systems across the network managed by the software layer for chaining applications and analytics expressions. Optimizing the layout of the applications and analytics based on resource availability. Monitoring the health of the software layer. Storing of raw sensor data or results of expressions in a local time-series database or cloud storage. Services and components can be containerized to ensure smooth running in any gateway environment.

Edge intelligence is enabled at the source of the Internet of things (IoT) data. A system provides enriched access (stream or batch modes, or both) to IoT device sensor data for real-time edge analytics and applications. The system includes a highly efficient and expressive computer language for executing analytical functions and expressions, through a high performance analytics engine that operates in low memory footprint machines. The system allows publishing of aggregate data to cloud to further machine learning. The system includes a software development kit for developing edge apps. A cloud-based management console allows managing of edge deployments, configuration, applications, and analytics expressions.

A specific implementation of an edge infrastructure and platform is by FogHorn Systems, Inc. (FogHorn). The FogHorn Web site, www.foghorn-systems.com, publications (including white papers, user guides, tutorials, videos, and others), and other publications about FogHorn technology and products are incorporated by reference.

FogHorn provides a platform to enable edge intelligence for industrial and commercial internet of things (IoT) data. The amount of data generated by tens of billions of industrial and commercial IoT devices will be massive enough to overwhelm the entire Internet. The FogHorn platform processes, analyzes, and responds to IoT data right where it originates—at the edge of the network. FogHorn's "intelligent edge" software platform enables unprecedented levels of automation, operational efficiency, cost savings, and much more.

The Industrial Internet of Things (IIoT) consists of interconnected industrial and commercial devices such as sensors, machinery, and computers. The goal of IIoT is to enable greater device control, data management, machine automation, and operational efficiency across a distributed enterprise. Companies can apply fog computing at the edge to capture greenfield IIoT opportunities using real-time analytics and automated responses while also leveraging cloud computing for system-wide management and optimization. FogHorn edge computing platform is also designed to run in existing programmable logic controllers (PLCs) (e.g., Brownfield opportunities) if adding additional computing resources is not viable. Brownfield refers to an implementation of new systems to resolve information technology (IT) problem areas while accounting for established systems. New software architecture takes into account existing and running software.

Edge intelligence platform is a software-based solution based on fog computing concepts which extends data processing and analytics closer to the edge where the IIoT devices reside. Maintaining close proximity to the edge devices rather than sending all data to a distant centralized cloud, minimizes latency allowing for maximum performance, faster response times, and more effective maintenance and operational strategies. It also significantly reduces overall bandwidth requirements and the cost of managing widely distributed networks.

Focusing on IIoT operations at the edge reduces overall bandwidth requirements and enables immediate automated responses to time-sensitive conditions. The industrial world is adding billions of new IIoT devices and collectively these devices generate many petabytes of data each day. Sending all of this data to the cloud is not only very cost prohibitive but it also creates a greater security risk. Operating at the edge ensures much faster response times, reduced risks, and lower overall costs.

U.S. patent application Ser. No. 62/210,981, filed Aug. 27, 2015, and Ser. No. 15/250,720, filed Aug. 29, 2016, are incorporated by reference and describe an edge computing environment and platform. U.S. patent application Ser. No. 15/467,306, filed Mar. 23, 2017, is incorporated by reference and describes efficient state machines for real-time dataflow programming. U.S. patent application Ser. No. 15/467,318, filed Mar. 23, 2017, is incorporated by reference and describes tools and methods for real-time dataflow programming language.

In an implementation, a system includes: a number of agents, each connected to a sensor, where each agent receives a data (e.g., stream data) from the sensors; and a data processing component includes a data bus, to which the agents are connected. The data processing component transforms streams of input into streams of output by forming a series of interconnected transductions. The transformation can include pattern matching, computations, and other operations. Each transduction can include one or more inputs, each given as a reference at least one of an external data source or a transducer; one or more outputs, each given as a reference either to at least one of an external data sink or a transducer. A result of attempting to match an input pattern to an input sequence can have at least three different states or degrees of completeness.

In another implementation, a method includes: interconnecting a number of agents and sensors, where the agents are connected to the sensors and receive streams of data from the sensors; and transforming or converting the streams of input from the sensors into streams of output via a series of interconnected transductions. Each transduction includes: one or more inputs, each given as a reference either to an external data source or a transducer; and one or more outputs, each given as a reference either to an external data sink or a transducer. For each input, there is a pattern to be applied to the input, to filter, collect, and organize the raw input into a more useful, partially processed or matched form, or to remove erroneous input. In a transducer, a triggering expression can be used to determine when to evaluate a filtering expression.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
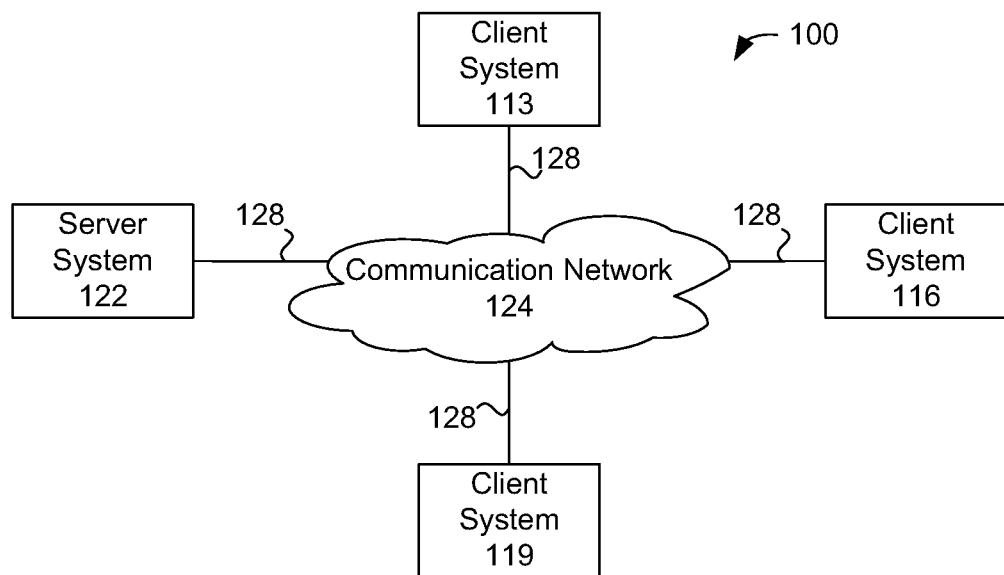
FIG. 1 shows a block diagram of a client-server system and network.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a stand-alone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
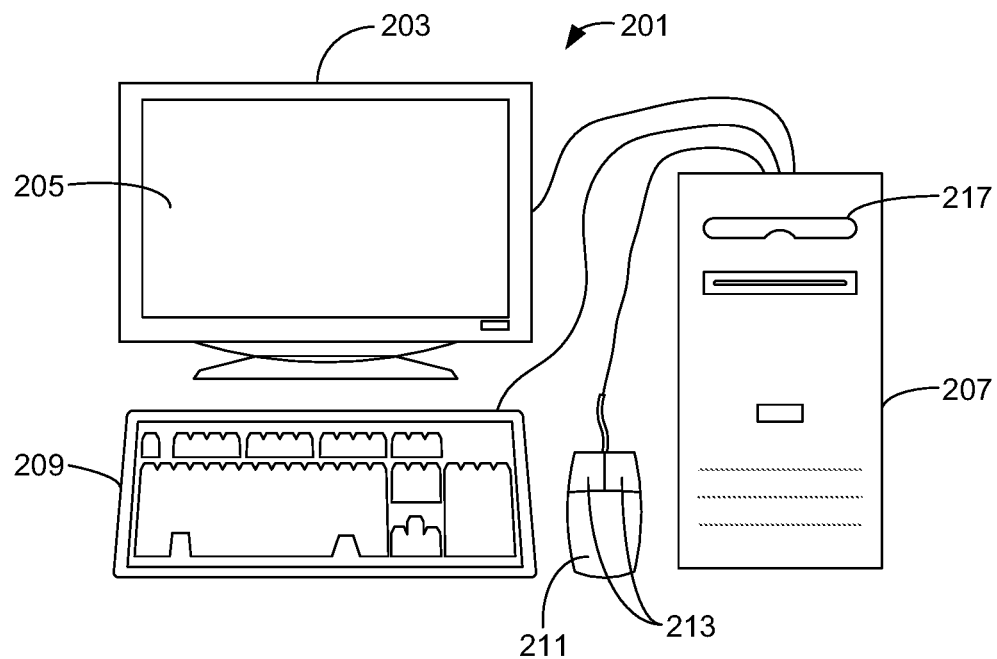
FIG. 2 shows a more detailed diagram of a client or server.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad or Apple iPad mini), Apple iPod (e.g, Apple iPod Touch), Samsung Galaxy product (e.g., Galaxy S series product or Galaxy Note series product), Google Nexus devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
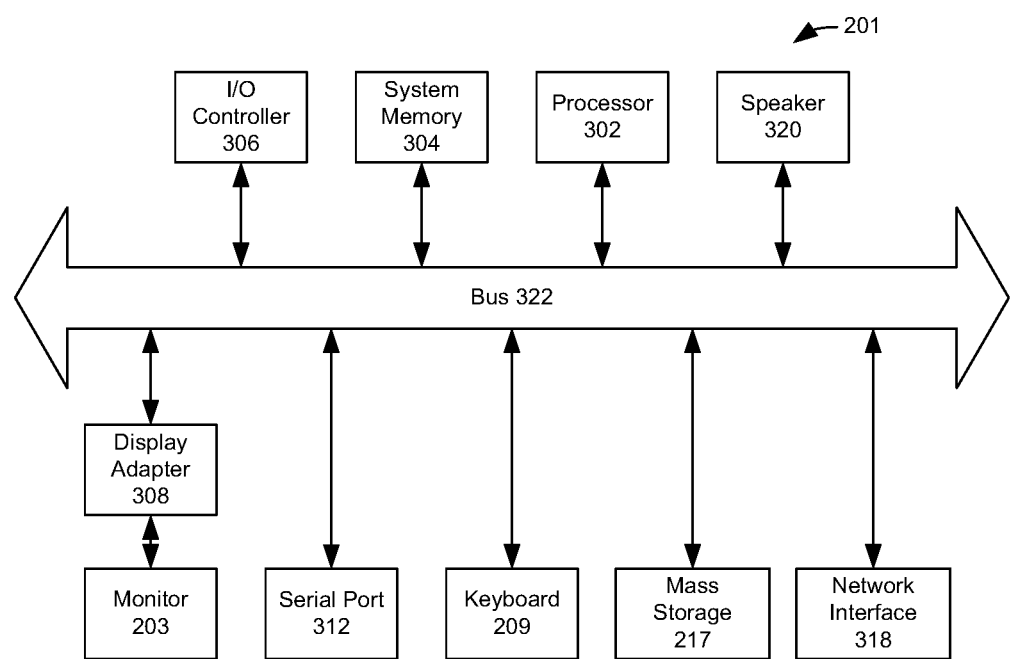
FIG. 3 shows a system block diagram of a computer system.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal™, Fortran™, Perl®, Matlab® (from Math-Works, www.mathworks.com), SAS, SPSS, JavaScript, AJAX, Java™, Python®, Erlang™, and Ruby on Rails®. The computer software product may be an independent application with data input and data display modules. Alternatively, the computer software products may be classes that may be instantiated as distributed objects. The computer software products may also be component software such as Java Beans™ (from Oracle Corporation) or Enterprise Java Beans™ (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

Figure 4:
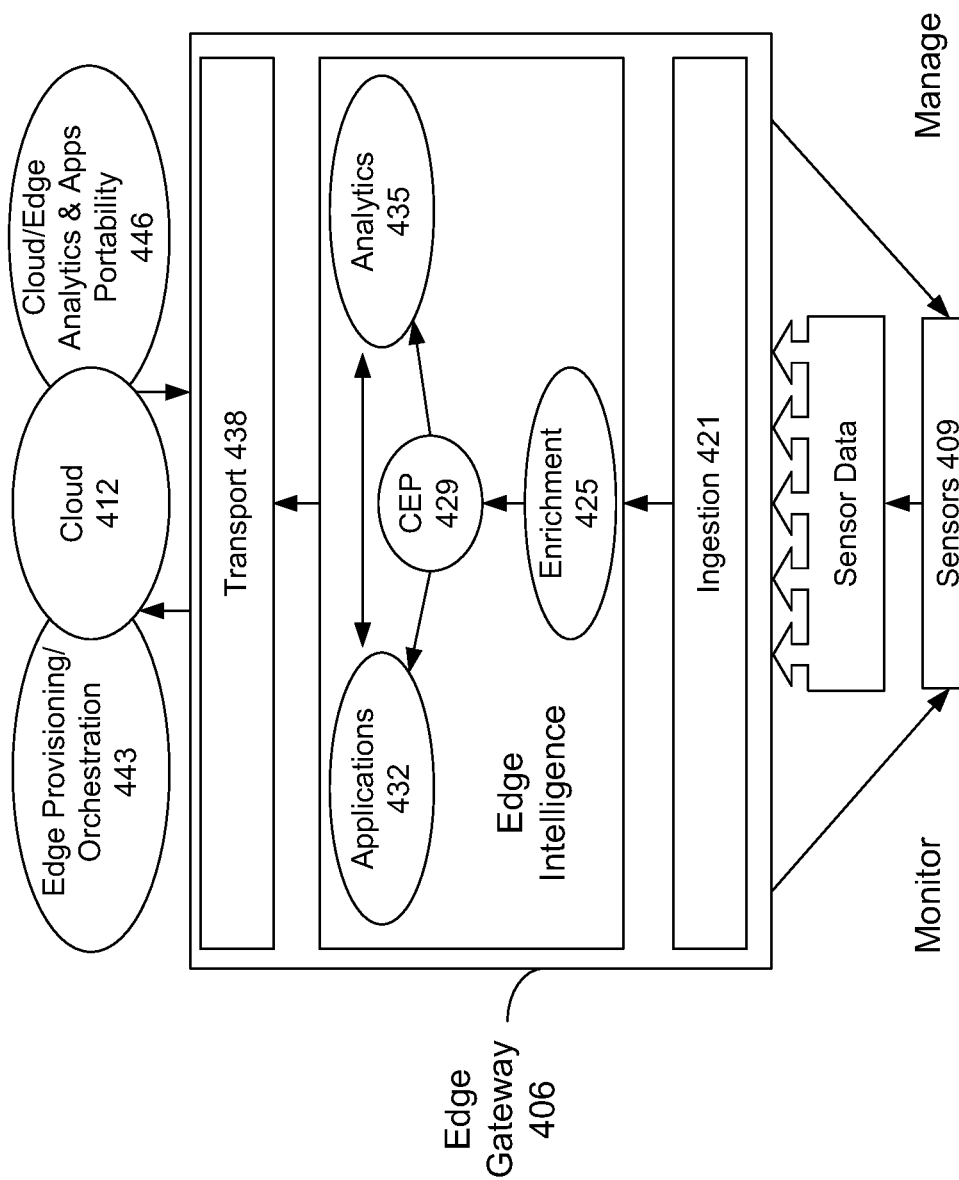
FIG. 4 a block diagram of an edge computing platform, which is between sensor streams and the cloud.

FIG. 4 shows a block diagram of an edge computing platform 406 typically running on an edge gateway or equivalent that is between sensors 409 and cloud 412. The edge computing platform enables deriving edge intelligence that is important for managing and optimizing industrial machines and other industrial Internet of things. Components of the edge gateway include the following: ingestion 421, enrichment 425, complex event processing (CEP) engine 429, applications 432, analytics through an expression language 435, and transport 438. The cloud can include edge provisioning and orchestration 443 and cloud and edge analytics and apps portability 446.

As discussed above, a specific implementation of an edge computing platform is from FogHorn. FogHorn is a leader in the rapidly emerging domain of "edge intelligence." By hosting high performance processing, analytics, and heterogeneous applications closer to control systems and physical sensors, FogHorn's breakthrough solution enables edge intelligence for closed loop device optimization. This brings big data and real-time processing on-site for industrial customers in manufacturing, oil and gas, power and water, transportation, mining, renewable energy, smart city, and more. FogHorn technology is embraced by the world's leading industrial Internet innovators and major players in cloud computing, high performance edge gateways, and IoT systems integration.

Foghorn provides: Enriched IoT device and sensor data access for edge apps in both stream and batch modes. Highly efficient and expressive DSL for executing analytical functions. Powerful miniaturized analytics engine that can run on low footprint machines. Publishing function for sending aggregated data to cloud for further machine learning. SDK (polyglot) for developing edge apps. Management console for managing edge deployment of configurations, apps, and analytics expressions.

FogHorn provides an efficient and highly scalable edge analytics platform that enables real-time, on-site stream processing of sensor data from industrial machines. The FogHorn software stack is a combination of services that run on the edge and cloud.

An "edge" solutions may support ingesting of sensor data into a local storage repository with the option to publish the unprocessed data to a cloud environment for offline analysis. However many industrial environments and devices lack Internet connectivity making this data unusable. But even with Internet connectivity, the sheer amount of data generated could easily exceed available bandwidth or be too cost prohibitive to send to the cloud. In addition, by the time data is uploaded to the cloud, processed in the data center, and the results transferred back to the edge, it may be too late to take any action.

The FogHorn solution addresses this problem by providing a highly miniaturized complex event processing (CEP) engine, also known as an analytics engine, and a powerful and expressive domain specific language (DSL) to express rules on the multitude of the incoming sensor streams of data. Output from these expressions can then be used immediately to prevent costly machine failures or downtime as well as improve the efficiency and safety of industrial operations and processes in real time.

The FogHorn platform includes: Ability to run in low footprint environments as well as high throughput or gateway environments. Highly scalable and performant CEP engine that can act on incoming streaming sensor data. Heterogeneous app development and deployment on the edge with enriched data access. Application mobility across the cloud and edge. Advanced machine learning (ML) and model transfer between cloud and edge. Out of the box, FogHorn supports the major industrial data ingestion protocols (e.g. OPC-UA, Modbus, MQTT, DDS, and others) as well as other data transfer protocols. In addition, users can easily plug-in custom protocol adaptors into FogHorn's data ingestion layer.

FogHorn edge services operate at the edge of the network where the IIoT devices reside. The edge software stack is responsible for ingesting the data from sensors and industrial devices onto a high speed data bus and then executing user-defined analytics expressions on the streaming data to gain insights and optimize the devices. These analytical expressions are executed by FogHorn's highly scalable and small footprint complex event processing (CEP) engine.

FogHorn edge services also include a local time-series database for time-based sensor data queries and a polyglot SDK for developing applications that can consume the data both in stream and batch modes. Optionally, this data can also be published to a cloud storage destination of the customer's choice.

The FogHorn platform also includes services that run in the cloud or on-premises environment to remotely configure and manage the edges. FogHorn's cloud services include a management UI for developing and deploying analytics expressions, deploying applications to the edge using an application known as Docker (www.docker.com), and for managing the integration of services with the customer's identity access management and persistence solutions. The platform will also be able to translate machine learning models developed in the cloud into sensor expressions that can be executed at the edge.

As examples, an application applies real-time data monitoring and analysis, predictive maintenance scheduling, and automated flow redirection to prevent costly damage to pumps due to cavitation events. Another example is wind energy management system using FogHorn edge intelligence software to maximize power generation, extend equipment life, and apply historical analysis for accurate energy forecasting.

Figure 5:
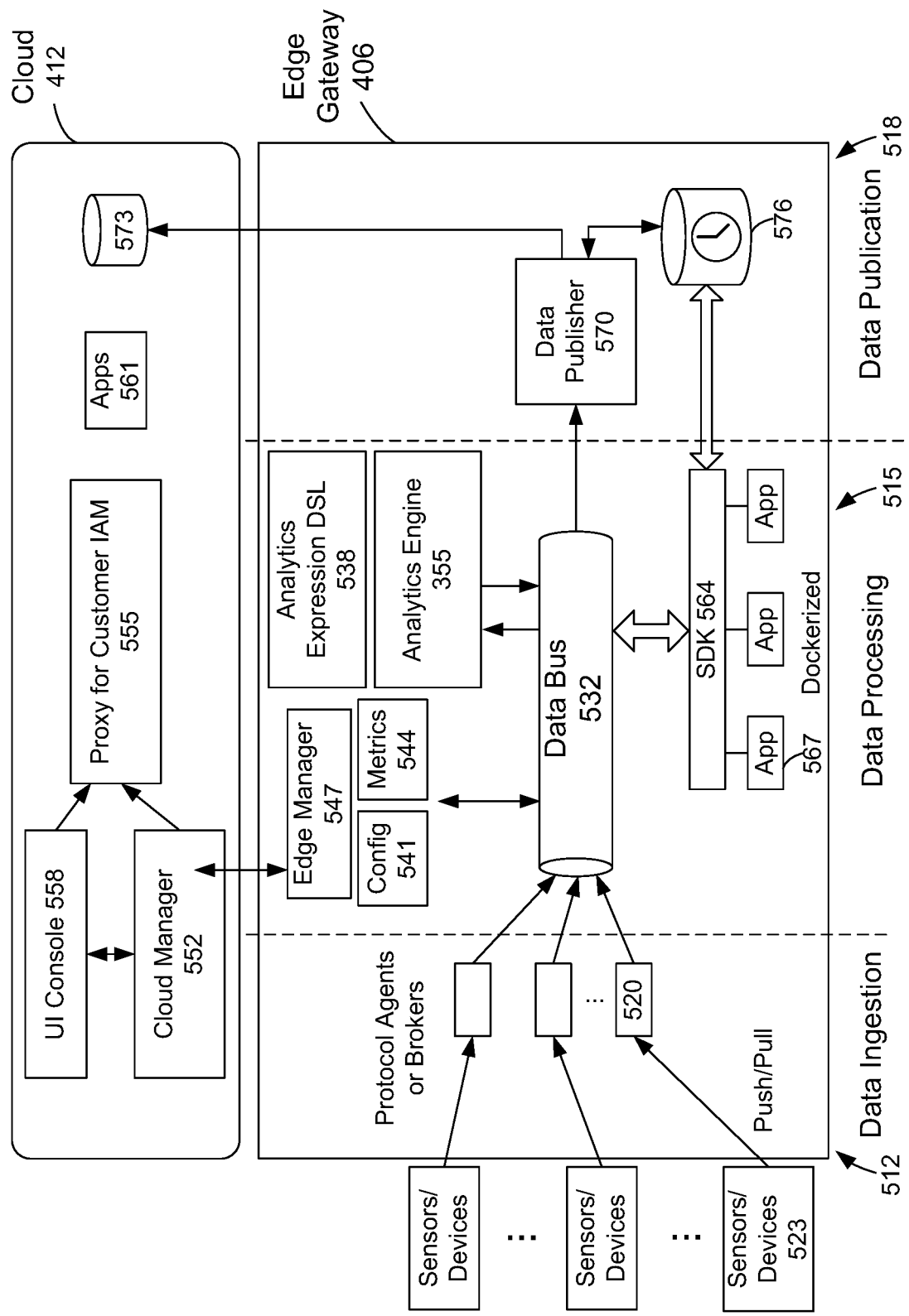
FIG. 5 shows a more detailed block diagram of an edge computing platform including edge analytics.

FIG. 5 shows a more detailed block diagram of an edge computing platform. This platform has three logical layers or sections, data ingestion 512, data processing 515, and data publication 518. The data ingestion components include agents 520 that are connected to sensors or devices 523 that generate data. The agents collect or ingest data from the sensors via one or more protocols from the respective protocol servers. The agents can be clients or brokers for protocols such as, among others, MQTT, OPC UA, Modbus, and DDS. The data provided or output by the sensors is typically a binary data stream. The transmission or delivery of this data from the sensors to the agents can be by push or pull methods.

Push describes a style of communication where the request for a given transaction is initiated by the sender (e.g., sensor). Pull (or get) describes a style of communication where the request for the transmission of information is initiated by receiver (e.g., agent). Another communication technique is polling, which the receiver or agent periodically inquires or checks the sensor has data to send.

MQTT (previously MQ Telemetry Transport) is an ISO standard publish-subscribe-based "lightweight" messaging protocol for use on top of the TCP/IP protocol. Alternative protocols include the Advanced Message Queuing Protocol, the IETF Constrained Application Protocol, XMPP, and Web Application Messaging Protocol (WAMP).

OPC Unified Architecture (OPC UA) is an industrial M2M communication protocol for interoperability developed by the OPC Foundation. It is the successor to Open Platform Communications (OPC).

Modbus is a serial communications protocol originally published by Modicon (now Schneider Electric) in 1979 for use with its programmable logic controllers (PLCs). Simple and robust, it has since become for all intents and purposes a standard communication protocol. It is now a commonly available means of connecting industrial electronic devices.

Data processing 515 includes a data bus 532, which is connected to the agents 520 of the data ingestion layer. The data bus is the central backbone for both data and control messages between all connected components. Components subscribe to the data and control messages flowing through the data bus. The analytics engine 535 is one such important component. The analytics engine performs analysis of the sensor data based on an analytic expressions developed in expression language 538. Other components that connect to the data bus include configuration service 541, metrics service 544, and edge manager 547. The data bus also includes a "decoder service" that enriches the incoming data from the sensors by decoding the raw binary data into consumable data formats (such as JSON) and also decorating with additional necessary and useful metadata. Further, enrichment can include, but is not limited to, data decoding, metadata decoration, data normalization, and the like.

JSON (sometimes referred to as JavaScript Object Notation) is an open-standard format that uses human-readable text to transmit data objects consisting of attribute-value pairs. JSON is a common data format used for asynchronous browser or server communication (AJAJ) or both. An alternative to JSON is XML, which is used by AJAX.

The edge manager connects to cloud 412, and in particular to a cloud manager 552. The cloud manager is connected to a proxy for customer identity and access management (IAM) 555 and user interface console 558, which are also in the cloud. There are also apps 561 accessible via the cloud. Identity and access management is the security and business discipline that enables the right individuals to access the right resources at the right times and for the right reasons.

Within data processing 515, a software development kit (SDK) 564 component also connects to the data bus, which allows the creation of applications 567 that work that can be deployed on the edge gateway. The software development kit also connects to a local time-series database to fetch the data. The applications can be containerized, such as by using a container technology such as Docker.

Docker containers wrap up a piece of software in a complete file system that contains everything it needs to run: code, runtime, system tools, and system libraries—anything that can be installed on a server. This ensures the software will always run the same, regardless of the environment it is running in.

Data publication 518 includes a data publisher 570 that is connected to a storage location 573 in the cloud. Also, applications 567 of the software development kit 564 can access data in a time-series database 576. A time-series database (TSDB) is a software system that is optimized for handling time series data, arrays of numbers indexed by time (e.g., a date-time or a date-time range). The time-series database is typically a rolling or circular buffer or queue, where as new information is added to the database, the oldest information is being removed. A data publisher 570 also connects to the data bus and subscribes to data that needs to be stored either in the local time-series database or in the cloud storage.

Figure 6:
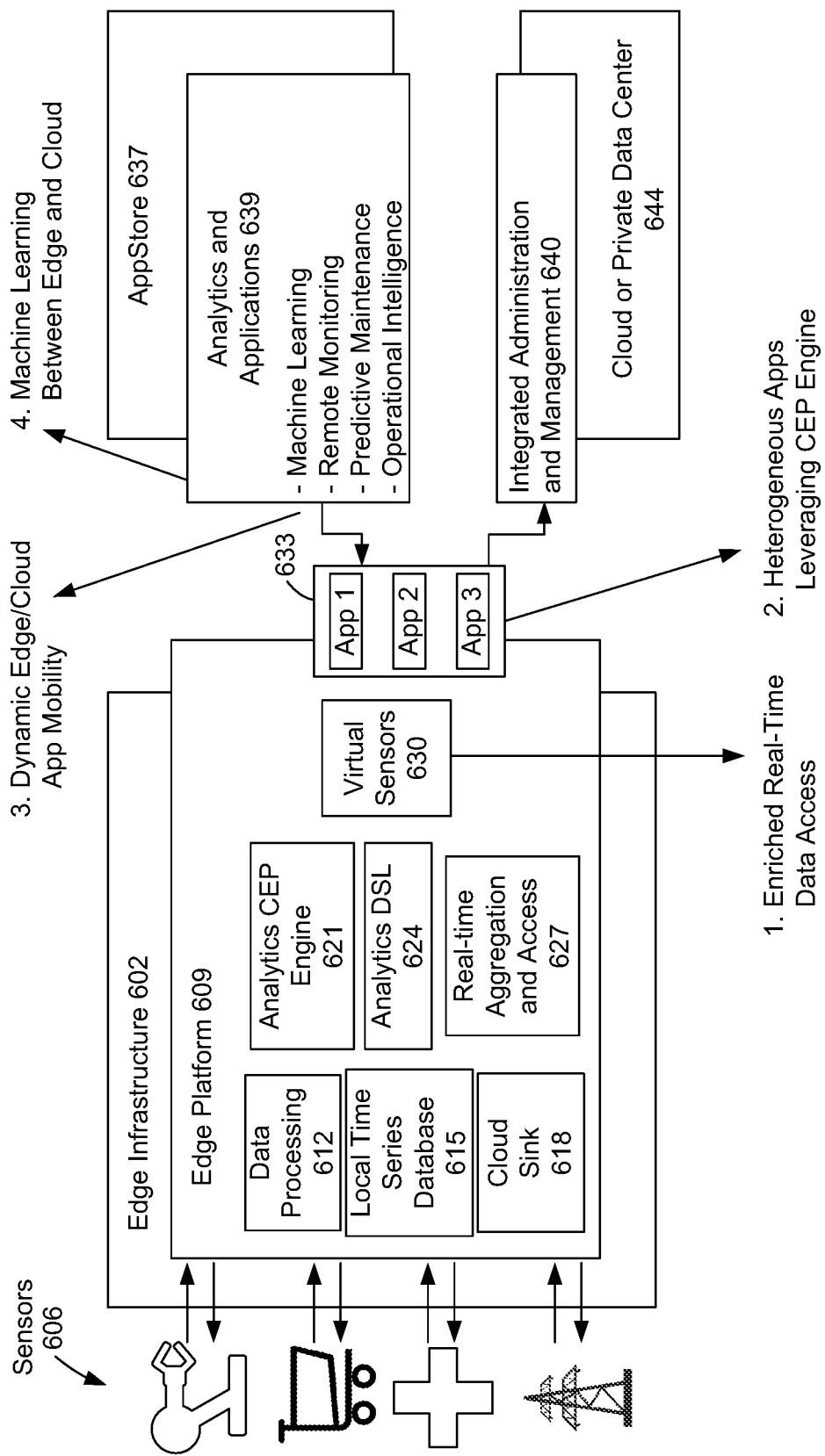
FIG. 6 shows an operational flow between edge infrastructure and cloud infrastructure.

FIG. 6 shows an operational flow between edge 602 and cloud infrastructures. Some specific edge infrastructures were described above. Data is gathered from sensors 606. These sensors can be for industrial, retail, health care, or medical devices, or power or communication applications, or any combination of these.

The edge infrastructure includes a software platform 609, which has data processing 612, local time-series database 615, cloud sink 618, analytics complex event processing engine (CEP) 621, analytics real-time streaming domain-specific language (DSL) 624 (e.g., the Vel language by Foghorn), and real-time aggregation and access 627. The platform can include virtual sensors 630, which are described below in more detail. The virtual sensors provide enriched real-time data access.

The platform is accessible via one or more apps 633, such as apps or applications 1, 2, and 3, which can be developed using a software development kit or SDK. The apps can be heterogeneous (e.g., developed in multiple different languages) and leverage complex event processing engine 621, as well as perform machine learning. The apps can be distributed using an app store 637, which may be provided by the edge platform developer or the customer of the edge platform (which may be referred to as a partner). Through the app store, users can download and share apps with others. The apps can perform analytics and applications 639 including machine learning, remote monitoring, predictive maintenance, or operational intelligence, or any combination of these.

For the apps, there is dynamic app mobility between edge and cloud. For example, applications developed using the FogHorn software development kit can either be deployed on the edge or in the cloud, thereby achieving app mobility between edge and cloud. The apps can be used as part of the edge or as part of the cloud. In an implementation, this feature is made possible due to the apps being containerized, so they can operate independent of the platform from which they are executed. The same can be said of the analytics expressions as well.

There are data apps that allow for integrated administration and management 640, including monitoring or storing of data in the cloud or at a private data center 644.

A physical sensor is an electronic transducer, which measures some characteristics of its environment as analog or digital measurements. Analog measurements are typically converted to digital quantities using analog to digital converters. Sensor data are either measured on need based (polled) or available as a stream at a uniform rate. Typical sensor specifications are range, accuracy, resolution, drift, stability, and other attributes. Most measurement systems and applications utilize or communicate the sensor data directly for processing, transportation, or storage.

The system has a "programmable software-defined sensor," also called a virtual sensor, which is a software based sensor created using an analytics expression language. In an implementation, the analytics expression language is FogHorn's analytics expression language. This expression language is known as Vel. The Vel language is implemented efficiently to support real-time streaming analytics in a constrained low footprint environment with low latencies of execution. For example, a latency of the system can be about 10 milliseconds or less.

In an implementation, the programmable software-defined sensor is created with a declarative application program interface (API) called a "sensor expression language" or SXL. A specific implementation of an SXL language is Vel from FogHorn. An Vel-sensor is a Vel-sensor created through this construct, and provides derived measurements from processing data generated by multiple sources including physical and Vel-sensors. In this application, Vel and SXL are used interchangeably.

A Vel sensor can be derived from any one of or a combination of these three sources:
  1. A single sensor data.
  1.1. A virtual or Vel sensor derived from a single physical sensor could transform the incoming sensor data using dynamic calibration, signal processing, math expression, data compaction or data analytics, of any combination.
  2. Multiple physical sensor data.
  2.1. A virtual or Vel sensor or derived as a transformation (using the methods described above) from multiple heterogeneous physical sensors.
  3. A combination of physical sensor data and virtual sensor data made available to the implementation of the Vel-sensor apparatus.

Vel sensors are domain-specific and are created with a specific application in mind. A specific implementation of Vel programming interface enables applications to define data analytics through transformations (e.g., math expressions) and aggregations. Vel includes a set of mathematical operators, typically based on a programming language. Vel sensors operate at runtime on data by executing Vel constructs or programs.

Creation of Vel Sensors. Vel sensors are designed as software apparatus' to make data available in real-time. This requires the execution of applications developed with the Vel in real-time on embedded compute hardware to produce the Vel-sensor data at a rate required by the application. The system includes a highly efficient execution engine to accomplish this.

Benefits of Vel sensors include:
  1. Programmability. Vel makes Vel sensors programmable to synthesize data to match specific application requirements around data quality, frequency and information. Vel-sensors can be widely distributed as over-the-air software upgrades to plug into data sourced from physical sensors and other (e.g., preexisting) Vel sensors. Thus application developers can create a digital infrastructure conducive to the efficient execution of business logic independent of the layout of the physical infrastructure.
  2. Maintainability or Transparency. Vel-sensors create a digital layer of abstraction between applications and physical sensors, which insulates developers from changes in the physical infrastructure due to upgrades and services to the physical sensors.
  3. Efficiency: Vel-sensors create efficiencies in information management by transforming raw data from physical sensors into a precise representation of information contained in them. This efficiency translates into efficient utilization of IT resources like compute, networking, and storage downstream in the applications.

4. Real-time data: Vel-sensors provide real-time sensor data that is computed from real-world or physical sensor data streams. This makes the data available for applications with minimum time delays.

Implementation. The system has architected a scalable, real-time implementation of Vel sensors based on a Vel interface. Vel includes operators supported by Java™ language and is well integrated with physical sensors and their protocols.

The system brings a novel methodology for precisely expressing the operations on physical sensors' data to be executed. This declarative expression separates the definition of the digital abstraction from the implementation on the physical sensors.

Given a set of streams of data of varying types and a set of functions meant to react to and handle specific patterns of data in those streams, this invention is a technique to describe and translate those functions such that they can be invoked appropriately and efficiently as data arrives in the streams.

The need to solve this sort of problem arises commonly in all forms of dataflow programming. It is applicable to very large-scale architectures, such as the flow of data within and between enterprise data centers, as well as to very small-scale architectures, such as the flow of events in an embedded device.

This invention is applicable to all domains of dataflow programming; however, it is most suitable in situations where the speed at which a match can be detected and a handler function applied is of utmost importance, and where there are limited storage and computing resources to devote to the execution.

Example. From a given stream of integers, we wish to match one or more nonzero values, followed by one or more zeros. When this pattern has been matched, we wish to compute the sum of the nonzero values and write the result to another stream.

We could write the pattern-matching portion of this problem in a regular expression notation, and then separately write the computation of the sum as an expression of arithmetic. As it happens, the Vel programming language, designed for use in dataflow applications in edge computing, allows us to write the whole transform in a unified notation, thus:
stream("output")=
(a:{!=0} . . . {>0}, :0 . . . {>0}→sum(a))
from stream("input")

Figure 7:
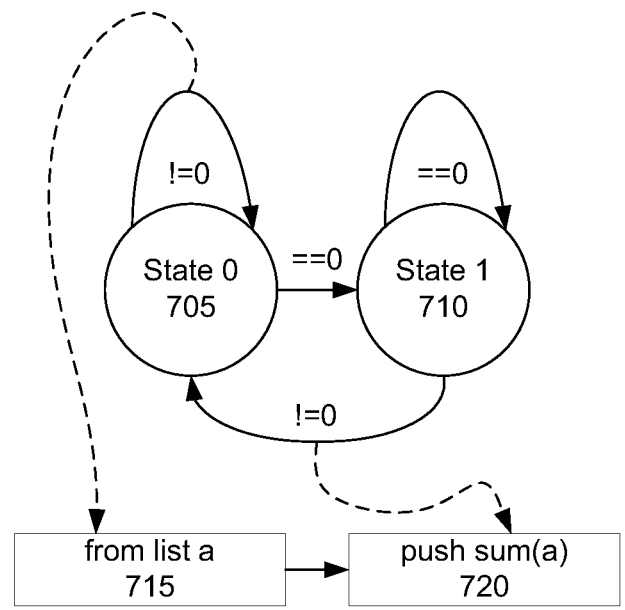
FIG. 7 shows an enhanced nondeterministic finite automaton (NFA) converted to a deterministic finite automaton (DFA) and state-reduced machine.

The technique would translate the above function parameterization into a state machine. It would then implement the match as a deterministic finite automaton based on that state machine, and feed the resulting matches to the summing expression. This flow is depicted in FIG. 7. This is a state 0 705, state 1 710, "from list a" block 715, and "push sum(a)" block 720.

This problem can be solved by generating a matching function for each handler function. The matching function accepts as input a window of data from the streams and returns true for a match and false for a nonmatch. As data flows through the windows, the matching functions must be applied repeatedly until a match is found. Once a match is found, the handler function is applied.

This solution arises because the handler functions are specified in a manner similar to that used for database queries. An SQL-like WHERE-clause provides a Boolean expression describing the conditions for match and the matching function is a direct compilation of this expression.

The separate matching functions must be evaluated individually as new data flows into the stream buffers. Matches are determined for each function independently.

Using a state machine to perform the match is more efficient than repeatedly applying multiple, arbitrary Boolean expressions.

The present invention derives a state machine from a pattern description language that declares the parameters of a function. The derived state machine more efficiently detects matches in a data stream than conventional Boolean expression matching functions.

The derived state machine may also implement a set of handler functions for matches detected in the data stream. Multiple matching and corresponding handler functions may be combined and reduced to a single state machine that efficiently recognizes matches for any handler function.

The derived state machine may also be augmented to include free (epsilon) transitions through additional nodes without altering the sequence recognized by the state machine.

Transitioning through such an additional node may trigger various actions on the data. For example, it may trigger collection of the data in the shift buffer of the deterministic finite automaton (DFA) or stack machine into a holding area. These data may later form the basis for arguments to function application.

This application uses the term DFA, but these automatons or units may be referred to stack machines. Strictly speaking, deterministic finite automaton implies finite performance in space. However, an automaton in this patent is not necessarily finite, but can be nonfinite, yet still simple. Therefore, the DFAs as described in this patent may be nonfinite.

Transitioning through such an additional node may also trigger the invocation of a handler function, using the data captured in prior nodes as function application arguments.

Translation from a script combining aspects of regular expressions and value expressions gives rise to an augmented state machine or DFA which can efficiently match patterns and compute values.

The resulting combined matching or computing algorithm is more efficient than separate organization of pattern matching and value computing.

A method for constructing the DFA or state machine from the lexical source, beginning with a nondeterministic finite automaton (NFA) and then reducing it to a minimal DFA. The purpose of the DFA is to recognize a pattern within series of input data. For the purposes of this discussion, we will call the data flowing through the state machine tokens and a particular pattern recognized by the DFA as a language of the tokens.

Figure 8:
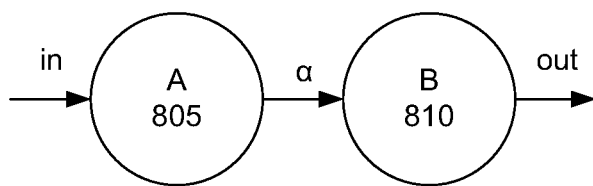
FIG. 8 shows a transition from state A to B upon receipt of the token alpha.

Consider the portion of the NFA in FIG. 8. This portion also happens to be a DFA, but this is not important for the purpose of this example. It transitions from state A 805 to state B 810 upon receipt of the token alpha.

Figure 9:
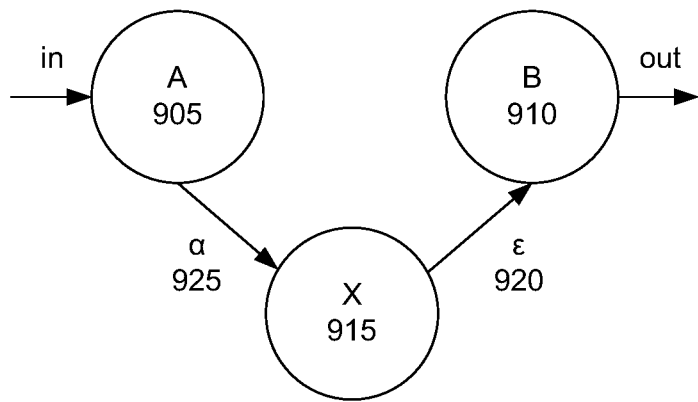
FIG. 9 shows a transition from state A to B through a extra state transition, state X.

We may augment this NFA by adding an additional node with an epsilon transition 920, as shown in FIG. 9. An epsilon edge may be followed at any time—for free, as it were—regardless of the state of input.

The presence of one or more epsilon edges make the state machine nondeterministic; however, epsilon edges may be removed by an algorithm, with the NFA reduced by this means to an equivalent DFA which can be implemented efficiently by a table-driven method. We can therefore introduce these extra epsilon transitions while still retaining a strategy for efficient implementation.

The state machine in FIG. 9 will transition from state A 905 to state X 915 upon receipt of token alpha 925, and can then proceed at will from state X to state B 910 at will. The impetus of alpha still results in a transition from state A to state B, just as it did in the simpler machine in FIG. 8, and no additional inputs are required to achieve this transition. It can therefore be seen that the NFA in FIG. 9 translates the same language that in FIG. 8. It simply takes an extra state transition, through state X, in order to do so.

The extra state is useful in that we may associate with it the performance of side-effects. So long as these side-effects alter neither the definition of the state machine nor the data flowing through the state machine, the additional node will have no effect on the recognition of language, but the side-effects can do additional work.

In a data flow reaction implementation, the additional work could include any number of useful actions on or using the data. In one exemplary implementation, the work can include:

1. Examining the data flowing through the node and emitting a copy of it to an outside collector;
2. Applying a transform to data as it flows through the node and collecting the transformed data and in a temporary buffer; OR
3. Flushing collected data from a temporary buffer into an additional transform and pushing the result to another DFA or stack machine.

As an example, let us consider the source fragment:

(a:{!=0} . . . {>0}, :0 . . . {>0}→sum(a))

The fragment describes a pattern consisting of two terms: (1) A first term, called a, which matches one or more recurrences of nonzero values. (2) A second term, not given a name, which matches one or more recurrences of zeros.

Let us suppose we wish to use this as the basis for a reaction. We will read values from a source called in, and when we recognize the fragment's pattern among the input, we will react by evaluating the fragment's right-hand side and pushing the result to a destination called out.

For example, if in consisted of the values [101, 202, 303, 0, 0], we would match the pattern by binding the first three values to a and the last two values to the anonymous second term. We would then evaluate the right-hand side by applying the sum function to the list of values bound to a, [101, 202, 303], returning 606. We would then push 606 to out.

The translation of a functional pattern such as in this example in accordance with this invention may be implemented via a computer-executed translation program. The program would have to perform two different forms of translation: translating the function-oriented portion "sum (a)" into a block of executable statements that would perform the computation, and translating the pattern-oriented portion "a: {!=0} . . . {>0}, :0 . . . {>0}" into a DFA or stack machine which would recognize the pattern, capture the arguments, and invoke the function. Let us call the former task function translation and the second task pattern translation.

Function translation is well understood by computer programmers who specialize in the writing of compilers and interpreters. Pattern translation, the fitting together of function translation and pattern translation, and the subsequent automation of pattern recognition and function dispatch, are the subjects of this invention.

Function translation consists of accepting a source text, breaking the text into tokens, and then, guided by a grammar, arranging the tokens such that they form the leaves of an abstract syntax tree (AST) which describes the syntactic content of the source text. The abstract syntax tree is then traversed by a series of algorithms which ultimately produce the blocks of instructions required to evaluate the functions described by the source.

Figure 10:
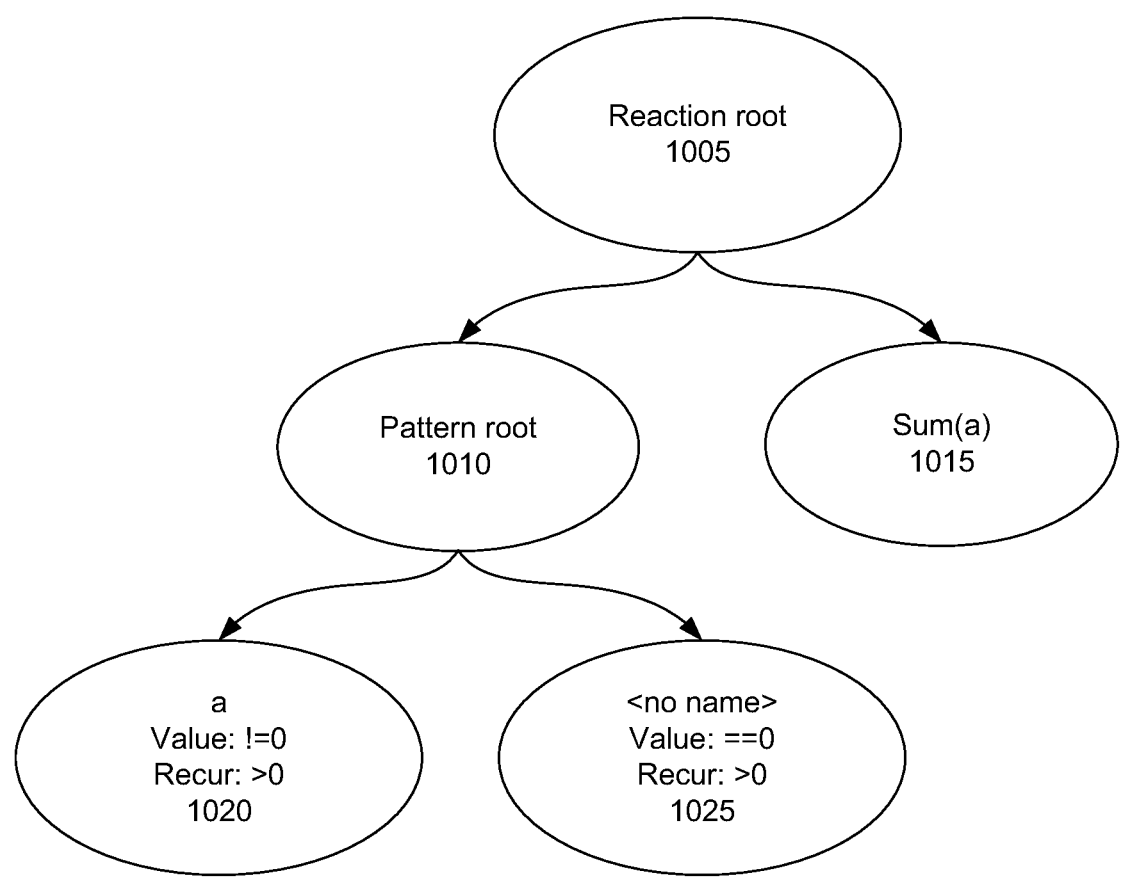
FIG. 10 shows an example of an abstract syntax tree formed by the syntactic analysis.

Pattern translation begins with the abstract syntax tree formed by the syntactic analysis described above. The abstract syntax tree will contain one or more nodes which form the roots of pattern declarations. For example, our pattern above might consist of a single root node with two children, each child describing one term of the pattern, as depicted in the lower-left portion of FIG. 10. In FIG. 10, there is a reaction root node 1005, pattern root node 1010, sum(a) node 1015, a node 1020, and <no name> node 10.

Recognize that a pattern term node, specifying as it does an example to match and a recurrence with which to match it, carries the same information as does a term in a regular expression. In addition, the sequence of child nodes, taken together and in order, specifies the same information as a linear conjunction of regular expression terms. A linear conjunction of regular expression or regular expression terms can be translated terms into an NFA. We have discovered the same algorithm can be used in the present invention, with pattern terms standing in for regular expression terms.

Once the basic NFA is so formed, we may inject into it our extra, side-effect-inducing states in positions where actions is required by pattern terms, and after the accepting state, to invoke reaction's function.

To continue our example, term a requires that we collect a list of the values which match it so we may eventually pass them as an argument to the reaction's function. We thus apply the transformation depicted in FIG. 9 to the NFA state resulting from term a and use the new state to do the work of collecting matching terms. We then apply the transformation again, this time to the NFA's accepting state, and use the collected values to call the reaction's function, push the result to the reaction's consumers, and clear the collection buffer. After this enhanced NFA is converted to a DFA and state-reduced, we are left with the machine depicted in FIG. 7.

The steps are used to convert an NFA to a DFA, to state-reduce a DFA, and to render a DFA as a state-action table, as is the algorithm for using a state-action table to drive a state-machine engine.

The NFA produced by a technique this invention can be transformed and rendered into a table. However, the resulting table includes an extra column consisting of the side-effect lambda to be executed when passing through each state. The automation engine that uses such a state-action-lambda table will, unlike other techniques, execute the additional lambda each time it undergoes a transition.

A method for describing and translating reactive functions for use data flow computing environments, includes: (i) identifying a reactive function; (ii) identifying the pattern of parameters providing inputs to the function; (iii) identifying the expression to be evaluated based on the arguments passed to the function; (iv) translating the pattern of parameters into a state machine capable of recognizing the sequences of input which match the pattern; (v) augmenting the state machine with additional states which do the work of collecting and transforming input data to prepare it for use as arguments to the function; and (vi) reducing the state machine to a state-action-effect table capable of automation by simple software or hardware.

Given a set of functions and a sequence of values as arguments, this invention is a method to dispatch execution to the function which the arguments match, or to determine that the arguments match none of the functions. This method is novel in that, by combining value expressions, type expressions, and regular expressions, it can match without ambiguity any sequence of values representable in the type system.

The need to solve this type of problem arises in the development of translators, interpreters, and compilers and is closely related to the notion of polymorphic dispatch. If one considers the elements forming an arbitrary prefix of the sequence to constitute single object (a tuple), then the task of dispatching to the correct function can be thought of as equivalent to the polymorphic dispatch of method of the tuple's class.

This invention is applicable to any situation in which a this sort of polymorphic dispatch is required. This includes all manner of event-driven or reactive programs which must respond to a stream of data originating from outside of the program. The invention will be particularly useful in applications relating to the real-time processing of multiple streams of data, such as often occurs in edge or fog computing or networking environments.

Regular expressions are commonly used to detect strings which conform to a particular pattern. There are a number of regular expression languages, most closely related, and many tools which implement efficient matching engines based on them. These are generally limited to matching sequences of characters.

There are other pattern-based notations, which operate on domains other than strings. One example is XPATH, which describes patterns in XML documents. These notations are often less complete and less powerful than regular expressions and are tailored for a specific domain.

Some programming languages implement runtime polymorphic dispatch by means of a type-based pattern matching system. Multiple overloads of a function are defined, each taking a different pattern of types and values, and dispatch is resolved at runtime by matching the types and values of the arguments against the patterns of the function parameters. Haskell is one such programming language.

Language-specification languages describe context-free grammars as a series production rules. These rules constitute the syntax of the language. A compiler-compiler translates these rules into a table-driven deterministic finite state machine which can recognize instances of the language. Bison is an example of such a language-specification language and its associated compiler-compiler.

Grammar-driven pattern-matching systems such as regular expressions have the benefit of efficient execution due to being representable as simple machines such as deterministic finite automata (DFAs) or state machines, but they lack the broad modeling capabilities of a full type system. Type-driven pattern-matching systems such as that used in Haskell have much richer modeling capabilities, but often sacrifice what is representable in favor of a reasonably efficient implementation, yet still are not as efficient as the high-speed matching systems based on DFAs.

This invention deals with a type-based matching system which can match against all states representable in among its types and yet may still be implemented efficiently as a state machine. A generalized pattern of types and states is translated into table-driven state machine which will efficiently recognize instances of the pattern.

Defining function parameters based on these patterns allows a function to match exactly any arbitrary pattern of data and, in matching, bind its arguments from among the matching data elements. The state machine describing the matching pattern for a union of functions is formed by merging the state machines of the member functions, then reducing the result to a minimal number of states. Disambiguation between overloads, or detection of an overall nonmatch, occurs as early as possible in a sequence, speeding the resolution of the function application. A match may also be delayed until as late as possible in a sequence, producing the "greedy" version of the function which will accept as much input as possible.

A method combines value expressions, type expressions, and regular expressions, such that it can match without ambiguity any sequence of values representable in the type system. This method resolves a function application and dispatches to the correct overload with a minimal number of decisions. This method allows an overloaded function application to perform the same work as context-free grammar, recognizing a specific language by recursively recognizing grammatical subcomponents and applying transformation functions thereto.

This method is applicable in connection with a type system including a plurality of different types, for example: (1) A set of foundational monomorphic types, such as integers, real numbers, and strings. (2) A set of polymorphic types and their constructors, in particular a polymorphic set type with certain properties we shall shortly discuss. (3) A sum type. (4) A product type in the form of a record. (5) A product type in the form of a pattern, which is a generalization of a tuple to including repetition of its fields. (6) A lambda type, which maps a pattern type to any type. (7) And, a poly-lambda type, consisting of a list of lambdas.

A set is a polymorphic type consisting of one or more ranges of elements. The set type is parameterized on the type of element it contains, such that a set of integers is a distinct type from a set of strings, for example. A set type is further characterized by limits on its contents. In particular, a set type may be constrained to be finite or infinite or to be closed or open on its left- or right-hand sides, or any combination of these. Consider the following examples of sets of integers:

TABLE A

| Notation | Length | Closedness | Meaning |
|---|---|---|---|
| [1] | 1 | closed on the left and right | A set consisting of the single integer 1. |
| [1, 2, 3] | 3 | closed on the left and right | A set consisting of three integers: 1, 2, and 3. |
| [5000 . . . 6000] | 1001 | closed on the left and right | The integers from 5000 to 6000, inclusive. |
| [10 . . .] | infinite | closed on the left, open on the right | All the integers equal to or greater than 10. |

TABLE A-continued

| Notation | Length | Closedness | Meaning |
|---|---|---|---|
| [... 10] | infinite | open on the left, closed on the right | All the integers less than or equal to 10. |
| [>5] | infinite | closed on the left, open on the right | All the integers greater than 5. The same as [6 ... ]. |
| [>=5] | infinite | closed on the left, open on the right | All the integers greater than or equal to 5. The same as [5 ... ]. |
| [<5] | infinite | open on the left, closed on the right | All the integers less than 5. The same as [... 4]. |
| [<=5] | infinite | open on the left, closed on the right | All the integers less than or equal to 5. The same as [... 5]. |
| [! = 5] | infinite | open on the left and right | All the integers except 5. |
| [>=1] and [<=3] | 3 | closed on the left and right | A set consisting of three integers: 1, 2, and 3. The same as [1, 2, 3] or [1 ... 3]. |
| [<=−10] or [>=10] | infinite | open on the left and right | All the integers with an absolute magnitude greater than or equal to 10. |
| not[1 ... 3] | infinite | open on the left and right | All the integers except 1, 2, and 3. |

There is no distinction between [>=1] and [>0] because the elements are of integer type and integers are distinctly enumerable. If the elements were of a nonenumerable type, such as real numbers or strings, then the explicit inclusion or inclusion of a specific endpoint becomes necessary. For example, the set [>="cat"] consists of the string "cat" and of all strings which sort lexicographically after "cat."

We may use an instance of a set as a type. The instances of such a type must be members of the set. For example, the set [>0], used as a type, would allow only positive integers as values. In fact, one may think of all types in this way. For example, the monomorphic integer type could be considered a set type consisting of the set of all integers.

Our sum type is a simple union of other types. For example, the type int or string is the sum of its two constituent types. Any instance of any of a sum type's constituent types is also an instance of the sum type. This allows us, for example, to describe the type list(int or string), which is a list of values, each of which is either an integer or a string. The union of unions flattens, so that the type expression (int or string) or (int or real) is equivalent to int or real or string. The order of the types in a union is not important, but for the sake of a canonicality, we present all union types here such that their constituents are in alphabetical order.

Our record type uses named fields and associates each field with a type. For example: {birthday: date; first_name: string; last_name: string}. A record type always has a finite number of fields and each field has a name unique within the type. The order of fields isn't important; {x: int; y: int} is the same as {y: int; x: int}; however, as we did for unions, we will present record types with their constituents in alphabetical order.

Note that the type of a record is itself a record. The value {x: 3; y: 4} has the type {x: int; y: int}.

Our pattern type is similar to a tuple in that it is defined as a sequence of types; however, while a tuple implicitly assumes each of its elements appears exactly once, a pattern permits each of its elements to have a recurrence. The recurrence is given as a set of integers. For example, the pattern <a: int # [1 ... 3]; b: string # [1 ... 3]> matches one to three integers followed by one to three strings.

When used as the parameters of a lambda, the fields of a pattern give rise to arguments which are bound within the lambda's evaluation. For example, after we matched the pattern given in the previous paragraph, we would have two local identifiers, a and b, in scope. The value of A would be a list of one to three integers and the value of b would be a list of one to three strings.

It is also valid for one or more fields in a pattern to have no name. A field with no name is matched but no value for it is bound as an argument. For example, if we matched <a: int # [1 ... 3]; string # [1 ... 3]>, we would match as before—one to three integers followed by one to three strings—and bind the integers as a list called a, but we would not bind the strings.

A pattern may be of infinite length. For example the pattern <a: int # [1 ... ]> will match one or more integers with no upper limit. This is valid; however, if used to process an endless input stream, an infinite pattern must be paired with some other trigger, such as a time interval, which will indicate when to stop collecting values.

Generally a pattern will consume the data that it matches; however, it is possible to consume only a subset of that data, or none at all. A pattern may contain at mark, called the peek point, beyond which it will match data and bind arguments, but not consume from the input stream. For example, the pattern <a: int; b: int; peek; c: int> will match three integers and bind three local identifiers, but only consume two integers from the input.

It is valid to have a record with no fields or a pattern with no fields. These two cases are meaningfully indistinguishable from each other, as they both denote the product type. Lexically, we designate this concept with the keyword void. The void is a unique value; it is also its own type. Used in a union, the void gives rise to the notion of an optional type, such as int or void, meaning a value which, if present is an int, but might not be present at all.

For our purposes, type-matching is structural, not nominative. A type does not have a name, only a description. Two types with the same description are the same type. A type whose description is a subset of that of another type is a generalization of that type. For example, consider the types {x: int; y: int} and {x: int; y: int; z: int}. The type with two fields—x and y—is a subset of the type with three fields—x, y and z—and thus the former may be considered a generalization of the latter. This is also true for patterns. A pattern which is a prefix of another is also its generalization.

Our lambda type maps an input pattern to an output type. For example <int # [1 . . . 3]>→int, which is the type of a function which takes one to three integers and returns an integer. Our poly-lambda type is made up of a list of lambda types. The order of the lambdas does matter here. When we are resolving a poly-lambda application, we will dispatch to the first of its constituent lambdas which matches.

Defined in this way, the pattern-matching required to dispatch a poly-lambda may be reduced to a deterministic finite automaton (DFA). To demonstrate how, we will use a method of state machine construction as a basis for comparison and augment it as necessary. A description involves first constructing a nondeterministic finite automaton (NFA) and then reducing it to a DFA; however, in practice, this can generally be done in a single step.

As previously discussed, this application uses the term DFA, but these automatons or units may be referred to stack machines. Strictly speaking, deterministic finite automaton implies finite performance in space. However, an automaton in this patent is not necessarily finite, but can be nonfinite, yet still simple. Therefore, the DFAs as described in this patent may be nonfinite.

Figure 11:
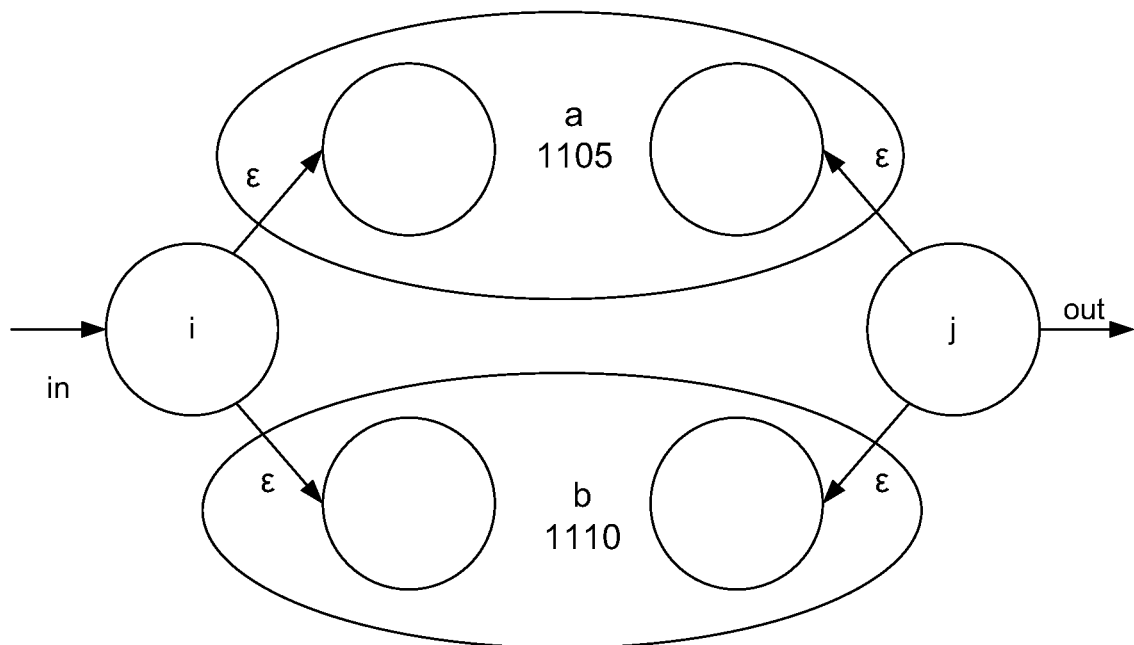
FIG. 11 shows a subgraph for alternation.

First, the constituents of the poly-lambda—the individual lambda patterns—must be thought of as elements of an alternation. In translating a regular expression, the syntax a|b (a OR B) is an alternation: match a 1105 or match b 1110. In our case, a AND b are each lambda patterns. We construct a subgraph for alternation as per FIG. 11.

Figure 12:
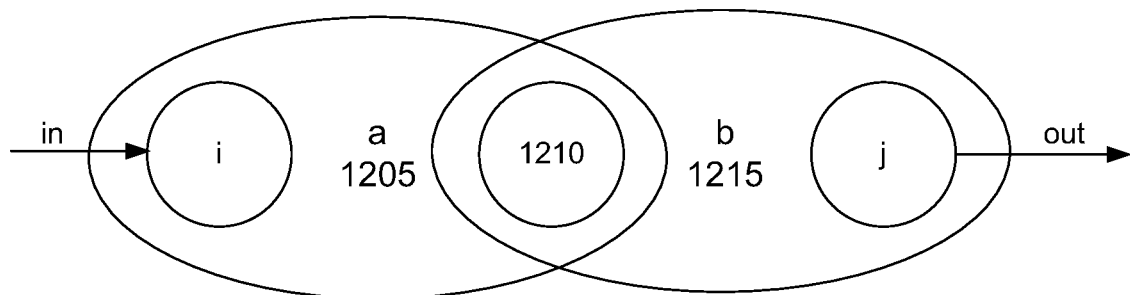
FIG. 12 shows a subgraph for conjunction.

We represent the fields of an individual pattern first by conjunction. In translating a regular expression, the syntax ab 1210 is a conjunction: match a 1205, followed by b 1215. In our case, a AND b are each fields of a pattern. We construct a subgraph for conjunction as per FIG. 12.

Figure 13:
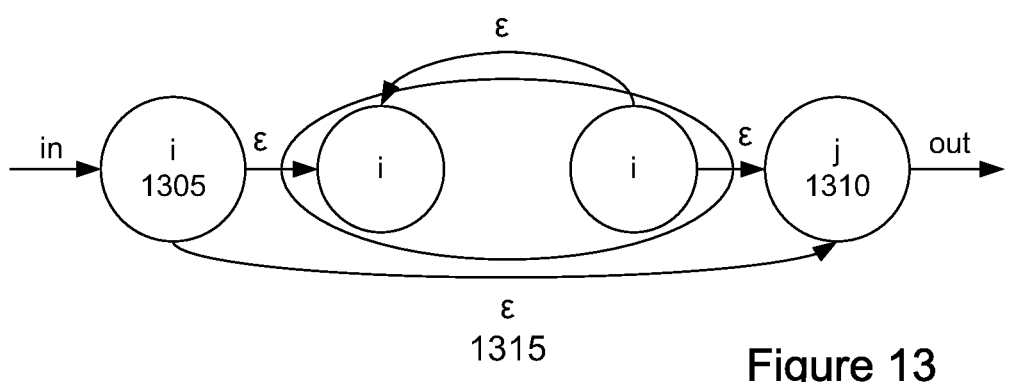
FIG. 13 shows a closure with structures.

The repetition factor of a field is the same as a closure in a regular expression, conventionally written as a+ or a* or a{n:m}. Again, we can represent these closures with structures like those in FIG. 13. In this case, some variation in the subgraph will be necessary based on the value of the repetition set. For example, the forward epsilon 1315 from node i 1305 to node j 1310 is only included if the set includes zero. These variations are largely obvious and continue along with the same basic idea set forth here.

After the intermediate NFA is complete, we reduce it to a DFA, then state-reduce the DFA until a minimal DFA is reached. We then render the DFA as a state-action table, suitable for automation by the usual sort of software or hardware employed in automating state machines. The accepting states of this table mark the entry points to the poly-lambda and the intermediate states provide the collection of data used to bind arguments.

When the DFA is so automated and provided a stream of inputs, it will match a prefix of inputs from the stream and dispatch to the correct overload to handle them, yielding a computed result. If this process is allowed to repeat, the result is a sequence of yielded results, one per match from the input stream. This provides efficient real-time processing of the input data stream by polymorphic functions triggered by corresponding patterns of arguments of various types detected in the data stream.

A method for dispatching execution of polymorphic functions in response to a data stream containing function arguments of multiple kinds, including a mixture of values and type identifiers, includes: (i) Identifying a polymorphic function to be executed, the polymorphic function having a plurality of overloads each associated with a pattern of arguments of different kinds. (ii) Identifying for each overload an output expression to be evaluated over the set of argument values bound from the input stream by matching the argument pattern of the overload. (iii) Translating the argument pattern of each overload into a DFA which will efficiently recognize a match for the pattern in an input stream. (iv) Combining the DFAs of the individual overloads into a single DFA for the polymorphic function as a whole, with the resulting combined DFA capable of matching any pattern that would be matched by the individual DFAs and selecting the overload which should process the matching input. (v) Applying a data stream to the combined DFA, the DFA then examining or consuming data from the stream, or both, as necessary to determine a match or the absence of a match and, in the case of a match, binding the input argument values appropriately and selecting the appropriate output expression to be evaluated. (vi) Dispatching evaluation of the output expression and returning the result.

Given a set of streams of data of distinct types being produced by reactive functions, this invention is a technique to represent those streams such that their outputs may be composed efficiently into a single stream of unified type.

The need to solve this sort of problem arises commonly in all forms of dataflow programming. It is applicable to very large-scale architectures, such as the flow of data within and between enterprise data centers, as well as to very small-scale architectures, such as the flow of events in an embedded device.

This invention is applicable to all domains of dataflow programming; however, it is most suitable in situations where the speed at which a match can be detected and a handler function applied is of utmost importance, and where there are limited storage and computing resources to devote to the execution.

Example. Consider an inflow consisting of a set of n separate input streams, $A_i: 0 < k < n$. Each stream consists of a queue of elements of type $T_i$. Each stream is being consumed and transformed by a reactive function, fi, of the type $T_i \rightarrow U_i$, such there is an outflow n streams, $B_i$, each consisting of a queue of elements of type $U_i$. We desire to merge the all streams $B_i$ into a single stream, C, using a merging function, m, of the type $\Sigma T_k \rightarrow \Sigma U_k$.

Here is an example of such a merge occurring between three streams, written in the Vel language:
B0=f0 from A0
B1=f1 from A1
B2=f2 from A2
C=B0 or B1 or B2

The stream C will consist of values from B0, B1, and B2, interleaved as they are generated. Notice that there is no point to realizing the contents of the B streams, as they are only used to compose the C stream. They could just as easily be represented as anonymous, temporary sub expressions:
C=(f0 from A0) or (f1 from A1) or (f2 from A2)

This invention describes translation of each transformation function fi into a deterministic finite automaton (DFA) and the merge function m as a union of these DFAs into a single, minimal DFA. The result is a maximally efficient means of merging the inflows $A_i$ into the outflow C without having to realize the contents of the intermediate flows $B_i$.

This technique may be applied repeatedly, conflating subsequent layers of intermediate flows into a single reactive function. This is consistent with the notion of a merge being denoted by an infix or operator in a declarative dataflow language, as is the case in Vel.

This problem is can be solved by brute force; that is, by realizing the intermediate flows and then consuming them, even if the merging function is the only consumer of the intermediate flows.

It is often also the case that the merge function requires its inflows and outflow to all be of the same type, or else of undifferentiated type in the case of typeless systems. This is due to a lack of union types (also called sum types) in their type systems. The presence of a true merge in a dataflow system mandates the use of union types.

Some dataflow systems lack a true merge, instead implementing multi-input-single-output reactive transforms. Although these are useful constructs in their own right, they are not as simple or general as a true merging function and cannot be optimized as completely.

Representing a matching function as a DFA is more efficient than expressing it as an arbitrary expression of Boolean type. The DFAs of multiple matching functions, each with its own driving inflow, are unified to form a single, efficient DFA representing a merge function with a single outflow. The merging of the DFAs may be done such that the result will match as early as possible or as late as possible, resulting in two different, potentially desirable behaviors. Composing multiple reactions into a single DFA results in a minimal machine; that is, an algorithm which performs all the matches using the minimal number of decisions. A minimal machine is most the suitable implementation of multiple reactions for small platforms. A minimal machine has an algorithmic advantage over multiple, separate evaluations of matching expressions and thus, all else being equal, will perform more efficiently.

To merge the set of transformation DFAs into a single DFA, we must consider them as we would alternations in a regular expression. In translating a regular expression, the syntax a|b is an alternation: match a OR match b. In our case, a AND b are each DFAs from transformation functions. We construct a subgraph for their alternation as per FIG. 11.

After the intermediate nondeterministic finite automaton (NFA) is complete, we reduce it to a DFA, then state-reduce the DFA until a minimal DFA is reached. We then render the DFA as a state-action table, suitable for automation by the usual sort of software or hardware employed in automating state machines. The accepting states of this table mark the points at which merged data elements are emitted to the output stream.

When the DFA is so automated and provided a set of input streams, it will transform each input according to the original transformation function associated with that input, and yield all results interleaved together on a single output.

A method for merging multiple, independent streams of input data into a single stream of output data, includes: (i) Identifying a plurality of potential input data streams. (ii) Identifying a plurality of transform functions, one per input stream, which are to be performed on the data in each input stream and the results of which are merged to be together. (iii) Identifying a merging function which receives input data elements from multiple streams simultaneously and interleaves data elements into a single output stream. (iv) Translating each transform function into a DFA which will efficiently perform the transform. (v) Merging the transform DFAs into a single combined DFA which will efficiently perform the transforms and interleave the results into a single stream. (vi) Applying the data streams to the combined DFA, the DFA then performing the work of transformation and merging. (vii) Dispatching the merged output to a destination for use.

This invention is a tool and associated methods for developing software in the Vel programming language. Vel is a programming language useful for expressing dataflow programs. Correct dataflow programming presents many challenges. Some are challenges common to all forms of computer programming while others are specific to the dataflow paradigm. This tool addresses many areas of Vel programming, including: (1) Checking for syntactic and semantic correctness. (2) Checking for logical correctness. (3) Debugging assistance. (4) Translation of source code into a secure and portable form (that is, packaged code). (5) Translation of source code or packaged code into a native and optimal binary form suitable for a variety computing platforms, particularly small platforms. (6) Describing packaged code and confirming its signature. (7) Batch-mode interpretation of packaged code. (8) Interactive interpretation of Vel source. (9) Simulation of a dataflow environment in which to run packaged or native code. (10) Remote execution, monitoring, and control of binary code in a live dataflow environment.

These are the tasks which anyone developing software in the Vel language needs to accomplish. This invention provides sufficient support in all these areas to allow a person proficient in Vel programming to produce correct and useful software.

Checking for syntactic and semantic correctness is a task common to many forms of automatic software translation. Tools for checking for logical correctness are usually not incorporated into the translation tool itself. It is common for these sorts of tools to exist separately, often with imperfect insight into the code they are testing.

Although debugging is a common task in software development, most debugging tools focus on imperative-style programming. Debugging of functional and reactive programming is much less commonly addressed as it presents challenges very different from imperative debugging. In particular, it can be difficult to examine computations "in flight" in these languages, as they values often do not have addresses at which the debugger (and debugging programmer) may peek.

The ability to target multiple native platform architectures is not uncommon for compilers of system languages, such as C, but it is not a power to be commonly found among script-level languages. Scripting languages tend not to be compiled, or to be partially compiled or just-in-time compiled (jitted) for their hosts, but cross-compilation (a compiler running on one architecture but generating code for another) is uncommon. Specifically compiling a script-level language for execution on a small platform is extremely uncommon.

An interactive shell is a common feature of scripting languages. Python®, for example, implements a shell. A shell which is connected to a dataflow environment, real or simulated, is far less common.

Remote execution of compiled code is a feature of some operating systems and is also available from several third-party tools, both open source and commercial. These tend not to target small platforms specifically, but some examples of remote execution tools for small platforms do exist. They are not specific to dataflow programming and are not incorporated into the tools used to develop the programs to be remotely executed.

A single, integrated tool for developing Vel code is useful and convenient for software developers working in the Vel language. The tool is principally a compiler, translating the Vel language, but it also offers several other sets of functions related to Vel programming. Having the tool perform logical correctness tests along with syntactic and semantic correctness tests helps the developer be more efficient and promotes greater correctness of code. The logic tests have the benefit of the compiler's insight into the code, so diagnostic messages can be more complete. The interactive shell enables the developer to test code and get an immediate response. This is useful for development as well as debugging. The shell also provides the programmer visibility into the dataflow environment.

Generating stand-alone binary executable code suitable for use on small platforms enables the Internet-of-Things use case, which often relies on performing complex computation on a variety of small devices. Providing a simulated dataflow environment helps developers work out bugs in their code and, in cooperation with tests for logical correctness, demonstrates that a package is working correctly. Remote execution of a compiled package, particularly when the remote platform is small, allows a programmer to iterate quickly on his program, compiling and testing the program on its target hardware in a single command, even if the target platform is not the one on which he is developing.

The process of translating a language from its lexical representation to an intermediate, symbolic representation (phase-1 compilation), and then transforming this intermediate representation into a form which may be executed by computing hardware (phase-2 compilation).

The Vel phase-1 translation tool follows the general strategy common to compilers, specifically: (1) Analyzing the input string to break it into a sequence of tokens. (2) Analyzing the sequence of tokens to form a syntax tree. (3) Identifying symbolic declarations within the tree. (4) Identifying and resolving symbolic references within the tree. (5) Early optimizations, such as common subexpression elimination and constant folding. (6) Type-checking. (7) Additional phases of optimizations and symbol maturation. (8) Finalization of symbols and emission of intermediate representation.

One of the distinguishing features of the Vel phase-1 translator is its use of deterministic finite automata or DFAs to perform the pattern-matching required for function application and to trigger reactions. The phase-1 translation tool includes: (1) A syntax analyzer transforming the input language to a syntax tree. (2) A lexical binding component which permits the program under translation to make self-reference, such that the language under analysis can be modified by the analyzer, in the manner of a DSL or macro-analyzer. (3) A semantic analysis algorithm translating the bound syntax tree into symbols representative of data flows, patterns, reactions, functional expressions, timers, and input-output parameterizations. (4) An expression translator which transforms expression trees into stacks suitable for more or less direct translation into microprocessor ALU instructions. (5) A DFA generator for translating the patterns and expressions of reactions into an intermediate collection of potentially nonminimal DFAs. (6) And a DFA combining and reducing algorithm for producing unified, minimal DFAs from the intermediate collection of DFA.

The output of the phase-1 translation tool includes: (1) The logical identities of each of the streams involved in the translation, such that each may be a unique referent among the plurality of streams. (2) A description of the flow in the data in each stream, each being inward (toward the reactions; that is, a subscription to an external source), outward (away from the reactions; that is, a publication to an external destination), both inward and outward (a publication/subscription pair), or internal (used only as intermediate steps in other reactions and therefore not surfaced as publications or subscriptions). (3) A description of the type of data flowing in each stream, each time being described in finite terms such that data being injected into or extracted from a stream may be statically checked for type correctness. (4) A set of tables describing the states and transitions of the DFAs. (5) A set of expression stacks describing the calculations which are to be performed during reactions. (6) A table mapping stream inputs to DFA inputs. (7) A table mapping timed events to DFA inputs. (8) A table mapping DFA outputs to action pairs, each pair consisting of a reference to an expression stack and a stream output, indicating that the output of the DFA is to be transformed by the given expression then pushed to the given stream.

The Vel interpreter and dataflow simulator use the output of phase-1 translation directly. The interpreter emulates a hardware platform in the execution of the code and the dataflow simulator emulates a streaming data environment, providing inputs to and collecting outputs from Vel streams. Let us call these two tasks instruction interpretation and dataflow emulation.

Instruction interpretation is a category of task well understood by computer programmers who specialize in writing compilers and interpreters. The task includes constructing an execution context in which the states of runtime variables may be stored, and then stepping through the instructions of the program one at a time, accessing data from the execution context and updating it as needed.

In the case of Vel, the execution context must also include a set of queues to hold streams of data in the process of transformation and a table-driven state machine engine to execute the transformations described by the DFAs. The queues arise due to declarations in the Vel source which describe flowing channels of data. Some of these are external inputs or outputs of the Vel program while others are purely internal channels describing intermediate states between input and output.

Dataflow emulation consists of providing access to external sources and sinks for data, such as files or sockets, and the programming necessary to exchange data between these external systems and the Vel program under interpretation. This will include injector functions, which read data from external sources and push them to the queues representing the program's inputs, and extractor functions, which pop data from the queues representing the programs outputs and write them to the external sinks.

Where Vel interpretation according to the invention differs from the norm is in the way the DFAs become involved. The state machine engines read data from the queues and use them to advance the states of their DFAs. The DFA tables include a column of side-effects which are executed when the DFAs move through their states. These side-effects invoke instruction interpretation to perform computation, the results of which are pushed to other queues and this trigger other DFAs.

In this way, a Vel program under interpretation according to the invention is firstly represented by a set of state machines—which are fast and small—and only drop back to general instruction interpretation when necessary. This allows the program to execute with greater efficiency than if it were all to be handled by instruction interpretation alone.

The Vel phase-2 translation tool is, for the most part, not specific to the Vel language but rather to the platform being targeted for execution. The Vel-language-related components of the phase-2 translator are: (1) Initial intake of the intermediate representation produced by phase-1. (2) Overall organization of the phase-2 code generation to produce a reactive system. (3) Provision of a library of runtime support components, such as those that perform external encoding and decoding of data formats or the internal regulation of real-time clocks.

A tool for creating programs for real-time processing of data streams in a multi-source, multi-destination data flow environment, includes: (1) Identifying a plurality of potential data streams. (2) Identifying a set of reactive functions and parameters corresponding to patterns of data in the streams. (3) Identifying a set of handling functions and parameters for transforming data matching declared patterns. (4) Identifying a set of timed events against which patterns of data flow are compared, such as intervals of time in which data are to be collected or discarded or specific points in time before or after which data are to be collected or discarded. (5) Creating a dataflow program describing the identified streams, reactions, functions, and timed events. (6) Providing the program as input to a two-phase translation tool comprising a phase-1 translation tool incorporating a DFA generator for translating Vel program statements to corresponding DFAs and a phase-2 translation tool for generating platform-specific hardware instructions corresponding to the translated Vel statements for execution on the platform. (7) Receiving the output of each phase of the translation tool.

The output of the phase-1 translation tool may be used by the interpreter component, includes: (1) An instruction interpreter which emulates a hardware platform in the execution of the code. (2) A data flow simulator which emulates a streaming data environment, providing inputs to and collecting outputs from Vel streams.

The output of the phase-1 translation tool may be used as the input to the phase-2 translation tool, includes: (1) A hardware instruction generator which translates instructions from the intermediate representation to a form suitable for execution by the target hardware platform. (2) A program organization module, which directs the generation of the output into a form suitable for use in as a reactive program in a dataflow environment. (3) Libraries of runtime support components necessary for execution. The output of the phase-2 translation tool is an executable program suitable for use on the targeted hardware platform.

Figure 14:
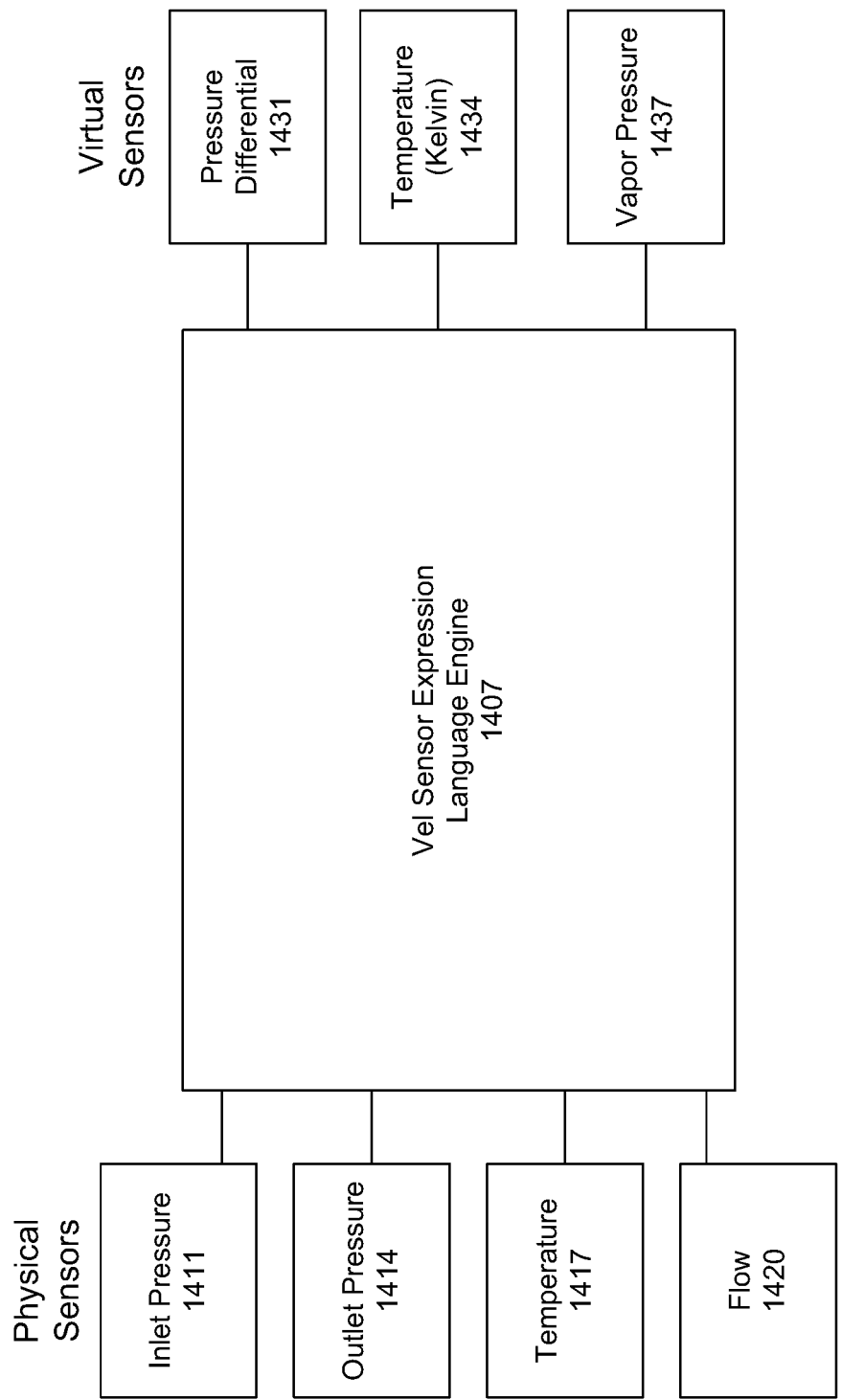
FIG. 14 shows an example of using physical sensors to create, via a sensor expression language engine, some virtual sensors.

FIG. 14 shows Vel sensor expression language engine 1407 that is used to create virtual sensors from inputs. The sensor expression language engine takes input from physical sensors or other virtual sensors. Some examples of inputs include inlet pressure 1411, outlet pressure 1414, temperature 1417, and flow 1420. Any number of inputs or combination of inputs can be used as input to a virtual sensor. Based on the input, the sensor expression language engine can generate an virtual sensors with outputs, such as pressure differential 1431, temperature 1434 (which may be in Kelvin), and vapor pressure 1437. There can be any number of virtual sensors and outputs. As described, the output can be a mathematical function of the inputs to the virtual sensor.

Although FIG. 14 shows a box (e.g., 1431, 1434, and 1437) that is representative of a virtual sensor. A virtual sensor can have multiple outputs. For example, virtual sensors 1431 and 1434 can be combined into a single virtual sensor having two outputs. Virtual sensors 1431, 1434, and 1437 can be combined into a single virtual sensor having three outputs.

The internals of Vel sensor expression language engine 1407 in FIG. 14 can be characterized by a dataflow programming described below. Given a set of streams of data of distinct type to serve as inputs, and a desire to transform these inputs into a stream of outputs via a dataflow program, this invention is a technique to implement a dataflow graph in such a way as to facilitate pattern-matching operations as a principle operation of the graph, and to incorporate pattern-matching as the a principle mechanism of invoking data transformation.

The need to solve this sort of problem arises commonly in all forms of dataflow programming. It is applicable to very large-scale architectures, such as the flow of data within and between enterprise data centers, as well as to very small-scale architectures, such as the flow of events in an embedded device.

This invention is applicable to all domains of dataflow programming; however, it is most suitable in situations where the speed at which a pattern match can be detected and a handler function applied is of utmost importance, and where there are limited storage and computing resources to devote to the execution.

Some background information is presented below about dataflow programming and will serve as a foundation for a discussion below on pattern-driven reactions. Dataflow programming models a computer program as a directed graph, called a flowgraph, with each exterior node specifying an input or output of the program, and each interior node specifying an operation to be performed. The data flowing into each node provides the input to its operation and the result of its operation provides the data flowing out of the node. A directed edge between a pair of nodes causes the output of the one node to become the input of the other. Thus data enters the graph, travels inside the graph through various operations, and exits the graph transformed in some useful way, all in a continuous flow.

Figure 15:
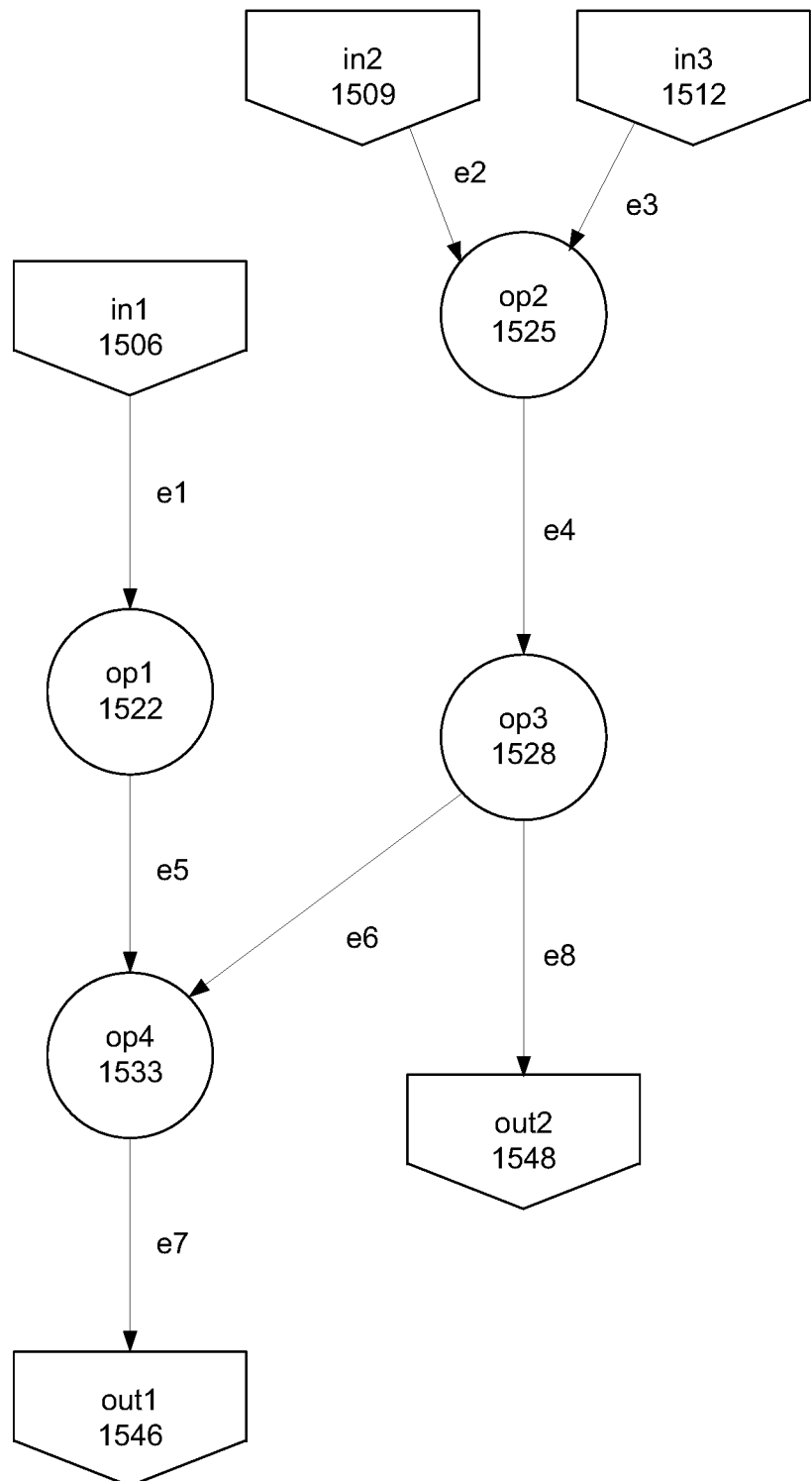
FIG. 15 shows an example of a flowgraph.

Flowgraph Structure. FIG. 15 shows an example of a flowgraph. Data enters the graph via three inputs nodes (in1 1506, in2 1509, and in3 1512), is transformed in four separate operation nodes (op1 1522, op2 1525, op3 1528, and op4 1533) and exits via two output nodes (out1 1546 and out2 1548). The edges, e1 through e7, indicate the paths over which data is permitted to flow.

The input nodes can be termed as injectors and the outputs nodes can be termed extractors. These nodes serve to connect the graph to external data systems; they do not transform the data in any way, although in some implementations they may buffer it temporarily. The injectors and extractors in FIG. 15 are represented with inverted-house-shaped nodes.

The interior nodes, where operations are performed, are termed transducers. For each input that arrives at a transducer, the transducer may produce zero or more outputs. The transducers in FIG. 15 are represented with circle-shaped nodes.

Figure 16:
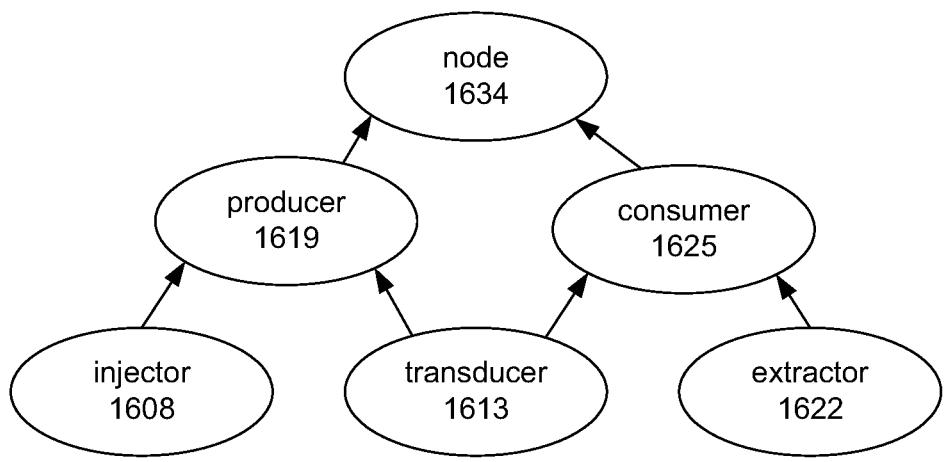
FIG. 16 shows a hierarchy of kinds of nodes.

A node which transmits outputs is termed a producer, while a node which receives inputs data is termed a consumer. An injector is a kind of producer, and an extractor is a kind of consumer. A transducer is both a producer and a consumer. FIG. 16 depicts this relationship.

FIG. 16 shows a hierarchy of kinds of nodes. An injector 1608 and a transducer 1613 input to a producer 1619. Transducer 1613 and an extractor 1622 input to a consumer 1625. Producer 1619 and consumer 1625 input to a node 1634.

Each producer may have zero or more outgoing edges attached to it. Each outgoing edge carries produced data away from the producer. Each consumer may have zero or more incoming edges attached to it. Each incoming edge carries data to be consumed into the consumer.

Each unique edge connects exactly one producer to exactly one consumer; moreover, for any given pair of producer and consumer, there can be at most a single unique edge. To put it another way, any given pair of producer and consumer are either connected by a unique edge or they are not.

Each unique edge is a kind of outgoing edge, because from the point of view of the edge's producer, the edge carries away data that has been produced. Each unique edge is also a kind of incoming edge, because from the point of view of the edge's consumer, the edge carries in data which is to be consumed.

Figure 17:
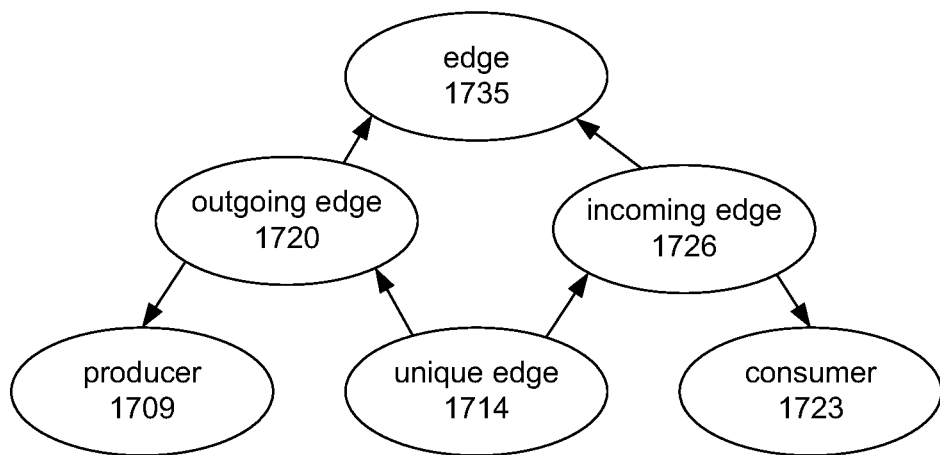
FIG. 17 shows a hierarchy of kinds of edges and their cardinality to nodes.

FIG. 17 shows a hierarchy of kinds of edges and their cardinality to nodes. This figure depicts the kinds of edges and their cardinal relationships with producers and consumers. A producer 1708 and a unique edge 1714 input to an outgoing edge 1720. Unique edge 1714 and a consumer 1723 input to an incoming edge 1726. Outgoing edge 1720 and incoming edge 1726 input to an edge 1735.

Transduction. As noted above, injectors and extractors do not alter their data; all alterations in data are performed by transducers. Like a function application, a transduction takes input values transforms them into output values; however, unlike a function, a transduction can take multiple input values and hold onto them, producing zero or more output values at a later time. The outputs of the transduction, even if produced as a burst, enter the output stream separately.

Input data arrives at a transducer from one or more producers. Each time new data arrives, the transducer activates, meaning that it is given the opportunity to act. The action chosen might be to discard the new data, to buffer it internally until a later time, or to use the new data, along with any previously buffered data, to produce one or more new outputs.

For example, we might imagine that op1 in FIG. 15 is a transducer which consumes a single stream of integers as input (along edge e1) and produces a stream of integers as output (along edge e5). Let us further imagine that op1 is programmed in such a way that it will buffer two inputs internally, then, upon the arrival of a third input, produce an output equal to the average of the three inputs.

Trace (1) shows a possible example of the action of the portion of the flowgraph around op1. Input data begin to arrive at 12:00 o'clock and by 12:05 op1 has seen three inputs, [12, 16, 5], the average of which is 11. Operation node op1 produces the average as its output at 12:05, the same moment it received the final input. This pattern then repeats starting at 12:06 and op1 produces another output at 12:10. And so on.

1. e1[12@12:00, 16@12:02, 5@12:05,
    18@12:06, 22@12:08, 3@12:10 . . . ]
    ==>op1==>
    e5[11@12:05, 14@12:10 . . . ]

In addition to its formal inputs, which arrive via its inbound edges, a transducer may also declare an informal input in the form of a time out. A time out is the maximum amount of time a transducer wishes to expire between its activations. If no new inputs arrive before the time out expires, the transducer will activate anyway, but in a special state indicating that it has timed out. In this way, a transducer may act on the absence of data as well as on its presence. Each time a transducer activates, it has the option to declare a new time out.

Let us revise the algorithm of op1 to say that it has a time out of 10 minutes. If three values have not arrived in that time, op1 will produce the average of whatever values it has.

Trace (2) shows a possible example of the action of the portion of the flowgraph around the new time-aware op1. Input data begin to arrive at 12:00 o'clock, at which point op1 declares a 10-minute time out. Another input arrives two minutes later at 12:02, but no further data arrives before the time out expires at 12:10. At 12:10, op1 produces the average of the two inputs it has seen and declares no further time out. And so on.

2. e1[12@12:00, 16@12:02, timeout @12:10 . . . ]
    ==>op1==>
    e5[14@12:10 . . . ]

Sampling versus triggering. When a transducer has two or more inputs, it is sometimes the case that some of its inputs will always cause the transducer to produce outputs, while other inputs will never cause it to produce outputs.

For example, we might imagine that op4 in FIG. 14 is a transducer which consumes two streams of integers as input (along edges e5 and e6) and produces a stream of integers as output (along edge e7). Let us further imagine that op4 is programmed in such a way that, each time an input arrives along e6, op4 will store a copy of the input internally. In this way, op4 will always know the most recent value from e6, but the arrival of values along e6 will not cause op4 to produce anything.

In addition, whenever an input arrives along e5, op4 will produce an output along e7 equal to the sum of the input and the most recent value from e6. Trace (3) shows a possible example of the action of the portion of the flowgraph around op4.

3. e5 [11@12:05, 14@12:10, 17@12:20 . . . ],
    e6[20@12:00, 30@12:15]
    ==>op4==>
    e7[31@12:05, 34@12:10, 47@12:20 . . . ]

At 12:00 o'clock, op4 sees the value 20 arrive along e6. It caches this as the most recent value of e6. At 12:05 and 12:10, values arrive alone e5. In each case, op4 produces an output using the live values of e5 and the cached value of e6. At 12:15, op4 caches a new value from e6 (which is 30) and uses it to produce output at 12:20, when another input arrives along e5.

In this example, we say that op4 is sampling e6 but it is being triggered by e5. Sampling is a passive action involving the accumulation of data inside of a transducer, while triggering is an action which exploits new and accumulate data to produce output.

It is sometimes the case that a transducer will sample all of its inputs and be triggered only by a time out. The time-aware version of op1 described above is an example of such a transducer.

It is also possible for a transducer to have no inbound edges at all and still produce outputs. Such a transducer is simply a timer, triggering only on time outs. This can be useful in some applications where it is desired to have a steady series of data produced on a fixed schedule.

A transducer with no triggering conditions is useless and erroneous.

Scheduling. A transducer activates whenever it receives input or when its time out expires, or both. At each activation, a transducer may produce zero or more outputs. A producer which has produced outputs which have not yet been consumed is to be hot; otherwise, it is cold.

It is up to the graph engine to choose a technique of handling the outputs of hot producers. There are two common, equally valid strategies: producer-driven and consumer-driven.

In a producer-driven graph, a producer activates as soon as possible. The outputs it produces travel along its output edges and are queued at its consumers. This is also called the push model, because the producers push data to their consumers as soon as the data is ready. In this model, a producer remains hot for the minimum amount of time.

In a consumer-driven graph, a producer activates only when its consumers are ready to consume. The outputs it produces are not queued because the consumer is already waiting them. This is also called the pull model, because the consumer pulls the data from their producers. In this model, a producer may remain hot indefinitely.

Notice that the direction of dataflow is the same in either strategy: from producer to consumer. The difference is which side, producer or consumer, the impulse to initiate dataflow resides.

Implementing a Dataflow Program. One may implement the dataflow concept in nearly any programming language; however, some languages are more suitable than others.

Dataflow programs are often written in functional languages, such as Scala or Haskell, because such languages model programs as a series of mathematical expressions to be evaluated without side-effects.

In a graph implemented in a functional language, the operation of each transducer is defined with an expression, and the runtime action of each node is simply the evaluation of its expression. Freedom from side-effects simplifies the execution model, helping to ensure that the nodes operate repeatedly and independently. Graph optimization is also simplified because the algebra used to combine and simplify expressions can also be applied to graph nodes.

However, it may be difficult, in a purely functional language, to implement transductions which depend on acquired state. In such cases, an imperative language like Java™ or C++ may be preferable, because such languages model programs as a series of instructions and side-effects (such as internal buffering) are permitted.

In a graph implemented in an imperative language, the operation of each transducer is defined with an event-handler function which is called each time inputs arrive or when the time out expires, or both. The function is free to take any internal actions it deems fit, and may produce outputs or declare a time out, or both. This grants great flexibility to the implementer but makes graph optimization very much more difficult, as it is hard to reason externally about the actions of the event handler.

Regardless of the language, the automation framework of the graph (the graph engine) and the specification of its nodes and the connections of its edges (the graph topology) are generally handled using a code library. The library typically provides abstractions, such as classes, from which to construct transducers, methods for connecting transducers with edges, and a main loop which runs the graph as an event-driven system. The flexibility of the language and the library define the limits of what is expressible in the graph and the efficiency with which the graph can be executed.

Pattern-Driven Reactions. The central concept of this invention is to organize the action of a transducer around the task of pattern matching. For the purposes of this discussion, a pattern matcher (or just "matcher" for short) is an algorithm which, given a set of syntactic and time-related rules, can organize an incoming stream of data-bearing events into a regular data structure. A technique referred to as timed forward right-most (1) or TFR(1) pattern matching is an example of such an algorithm.

Logical Programming. A pattern declaration is a form of logical programming, a model different from both imperative programming and functional programming. In logical programming, one or more free variables are declared and rules are given for how values may be assigned to them. In addition, one or more dependent expressions are defined, which make reference to the free variables. At runtime, the free variables acquire values according to the rules and the dependent expressions are then evaluated.

4. a=b+1 for b in [1, 2, 3]

In definition (4), b is a free variable and b+1 is a dependent expression involving b. The rule for assigning values to b is simple: b assumes the values from the list [1, 2, 3] in order. After execution, a is therefore equal to [2, 3, 4].

Pattern Rules. A pattern rule a form of logical expression which declares a pattern to be expected in a stream of input. It looks similar to a lambda expression, but we distinguish it from such by introducing it with a lower-case pi ($\pi$) instead.

5. p1=$\pi$a, b, c→(a+b+c)/3

In (5), the pattern p1 is declared to be three free variables, a, b, and c, in that order. When applied to an input stream, each free variable binds to a single value from the input, which means each free variable is of the same type as the stream to which the pattern is applied. The result of applying the pattern is given by the dependent expression to the right of the arrow, and is in this case equal to the average of the three inputs. This pattern is, in effect, the transduction shown in (1).

We may apply p1 to a stream in the way that a function would be applied to a value. For example, if x were a stream of integers, p1(x) would be a new stream of integers consisting of the values in x grouped by threes and averaged. p1(p1(x)) would be the average of the averages, and so on.

6. p2=$\pi$d[3]→sum(d)/3

In (6), we revise (5) to be a little shorter and more general. Instead of listing the three inputs separately (a, b, c), we collect them as a single input, d, which is three elements long. d matches three values from the input stream instead of just one. If the type of the stream is T, then the type of d will be list(T). We then compute the average with the help of a built-in function sum, which sums the elements of a list. p2 is functionally identical to p1.

7. p3=$\pi$d[1 . . . 3 or 10(min)]→sum(d)/len(d)

In (7), we revise (6) to introduce the notion of a variable-length match with a time out. Now the length of d is given as the interval 1 . . . 3, meaning it will match between one and three values from the input. The type of d will remain list(T); if it ends up matching only a single input, it will be a list of one element. The matcher will wait for up to 10 minutes for up to three values to arrive, but if time expires it will accept one or two values. The average is now computed with the help of an additional built-in function, len, which returns the number of elements in a list. This pattern is, in effect, the transduction shown in (2).

8. p4=$\pi$d[1 . . . or 10(min)]→sum(d)/len(d)

In (8), we revise (7) to introduce the notion of an open-ended match with a time out. Now the length of d has no upper limit. It will match at least one value, or as many as it can in its 10-minute window. The pattern is triggered by time out only.

9. p5= d[1 . . . ]→sum(d)/len(d)

In (9), we revise (8) to introduce the notion of an open-ended match with no time out. As in (8), the length of d has no upper limit, but now nothing will trigger the pattern. Applied by itself, this pattern would be erroneous. It only makes sense in the context of a join, which is the topic of a later section.

In terms of a flowgraph, each application of a pattern rule defines a transducer with a single input. (If the pattern has a time out, then the transducer will also have a time out.) The transducer contains the definition of the matcher derived from the pattern rule. When an input value arrives, it is given to the matcher. When the matcher produces a match, the match is used as an argument to evaluate the dependent expression, the result of which is then produced by the transducer.

A pattern which has not yet been satisfied results in a cold transducer, while a pattern which is fully satisfied results in a hot transducer. However, when a pattern of variable length is partially met, we require a new state, warm, to describe the transducer. A warm transducer is ready to produce an output, but need not do so. This is in contrast to a hot transducer, which is ready and must produce as soon as possible.

10. p6=πd[1 . . . 3]→sum(d)/len(d)

Consider p6, defined in (10), applied to a stream of inputs, represented by a transducer. Before any inputs arrive, the transducer will be cold. After a single input arrives, the transducer will be warm, because its pattern will be partially satisfied. It could accept up to two more inputs, or it could match what it already has. After two more inputs arrive, the transducer will be hot. It cannot accept any more inputs without first producing an output.

The 3-state (hot, warm, cold) instead of 2-state (hot, cold) model for transducer readiness is one of the key features of this invention. It directly facilitates pattern-driven reactions. Without it, variable-length patterns would be unusable.

Joining. A join is a yoking together of two or more input streams which are to be evaluated together to produce a single output stream. For example, if we had two sensors in a refrigerator, one for the door and the other for temperature, we might join the two streams together to produce an average temperature when the door is closed.

11. z1=a+b for a in x or b in y

TABLE B

| Time  | x  | y  | z1 |
|-------|----|----|----|
| 12:00 | 11 | 22 | 33 |
| 12:05 | 12 |    | 34 |
| 12:10 |    | 24 | 36 |
| 12:15 | 13 | 26 | 39 |

Notice that an output is produced when either of the inputs changes; that is, the evaluation is being triggered by changes in its input.

12. z2=a+b for a in x or b in y or every 3(min)

In (12), we add an additional triggering condition, which is a 3-minute time out. The following table gives some possible values of x, y, and z2 in light of this new trigging condition.

TABLE C

| Time  | x  | y  | z2 |
|-------|----|----|----|
| 12:00 | 11 | 22 | 33 |
| 12:03 |    |    | 33 |
| 12:05 | 12 |    | 34 |
| 12:08 |    |    | 34 |
| 12:10 |    | 24 | 36 |
| 12:13 |    |    | 36 |
| 12:15 | 13 | 26 | 39 |

Notice that the time out interval restarts after each value is produced, regardless of whether the value is produced due to a time out or due to a change in the inputs. For the purpose of triggering, the time out is being treated as another input.

13. z3=(a, b) for a in p5(x), b in y

In (13), we show a join involving the open-ended pattern p5 defined in (9). (Recall that p5 collects 1 or more values with no upper limit.) The following table gives some possible values of x, y, and z3 in light of this new trigging condition.

TABLE D

| Time  | x  | y | z3              |
|-------|----|---|-----------------|
| 12:00 | 11 |   |                 |
| 12:05 | 12 |   |                 |
| 12:08 | 13 | 0 | ([11, 12, 13], 0) |
| 12:10 |    | 1 |                 |
| 12:13 | 15 |   | ([15], 1)       |
| 12:15 | 16 | 2 | ([16], 2)       |

Notice that output production is never triggered by x because the open-ended pattern p5 cannot trigger anything by itself. However, changes in y can trigger production and, in the process, cause p5 to close, assuming it has collected at least one value. From 12:00 to 12:08, a is collecting values from x. At 12:08, a change in y causes the collection to close and an output to be produced. At 12:10, no output is produced because, although there is a change in y, the collection a is empty. However, at the first opportunity thereafter (12:13), a value for a having been provided, another output is produced. And so on.

In (11), (12), and (13), the expressions a in x, b in y, a in p5(x), and every 2(min) are examples of triggering expressions. They define the conditions under which the dependent expression will be evaluated.

The value of a triggering expression is hot, warm, or cold. In the case of a triggering expression which is tied to an input stream, the value is reflection of the readiness of the stream's producer. In the case of a triggering expression with is tied to the clock, the value is hot when the time out expires and cold otherwise. (Time-based triggering expressions are never warm.)

Two triggering expressions may be combined with the logical or operator, producing a new triggering expression. The new value of the combined triggering expression is determined by its left- and right-hand side operands, as defined in the following truth table.

TABLE E

| Lhs  | rhs  | out  |
|------|------|------|
| cold | cold | cold |
| cold | warm | warm |
| cold | hot  | hot  |
| warm | cold | warm |
| warm | warm | warm |
| warm | hot  | hot  |
| Hot  | cold | hot  |
| Hot  | warm | hot  |
| Hot  | hot  | hot  |

Two triggering expressions may also be combined with the logical and operator, producing a new triggering expression. The new value of the combined triggering expression is determined by its left- and right-hand side operands, as presented in the following truth table.

TABLE F

| Lhs  | rhs  | out  |
|------|------|------|
| cold | cold | cold |
| cold | warm | cold |
| cold | hot  | cold |

TABLE F-continued

| Lhs | rhs | out |
| --- | --- | --- |
| warm | cold | cold |
| warm | warm | warm |
| warm | hot | hot |
| Hot | cold | cold |
| Hot | warm | hot |
| Hot | hot | hot |

In terms of a flowgraph, each application of a pattern rule defines a transducer with two or more inputs. (If the pattern has a join has a time out, then the transducer will also have a time out.) The transducer contains the definitions of the dependent expression and of the triggering expression.

When the triggering expression of a join becomes hot, all input patterns that are not already closed are made to be closed and the dependent expression is evaluated.

When the triggering expression of a join becomes warm, the transducer sends a message to each of its producers, requesting that the producer accelerate.

An accelerated transducer will close its match as quickly as it can. If it is already warm, it will become hot. If it is cold, it will become hot at its earliest opportunity, bypassing any possible intermediate warm state. As soon as it produces an output, the transducer will automatically decelerate, resuming its normal behavior until it is accelerated again.

An accelerated injector, although possible, behaves no differently than an unaccelerated injector. It decelerates the next time it injects a value.

Note that the output produced by an accelerated producer is sent to all of its consumers, not just to those that requested acceleration. This maintains a consistent view of the dataflow across all observers.

The ability of a consumer to accelerate a producer is one of the key features of this invention. It directly facilitates pattern-driven reactions. Without it, open-ended patterns would be unusable.

Filtering. After a join is triggered and its dependent expression evaluated, it may yet not produce an output. An optional filter may suppress undesired results.

14. $z4=a+b$ for a in x, b in y if $a+b>0$

In (14) we see an example of a filter. The expression after the keyword if must evaluate to true for the value of the dependent expression to be produced as output.

The notion of a filter introduces no change to the structure of the flowgraph. It is merely an extra step taken by the transducer after it is triggered. However, it is worth noting that, without pattern matching, every activation of the transducer would require evaluation of an expression such as this, as there would be no distinction between activation (the arrival of inputs) and triggering (the satisfaction of preconditions for evaluation).

Expression evaluation is often far less efficient than pattern matching. A well designed pattern matching algorithm will consider each input only once per match, whereas an expression might need to re-evaluate each input many times before a condition is satisfied. A purely expression-based transducer can thus spend more time deciding whether or not to produce than it does producing.

A distinction between activation triggering is one of the key features of this invention. The performance enhancement it makes possible is one of the main benefits of the pattern-driven approach.

Sampling. As we stated earlier, every nonerroneous transducer must have some form of trigger, and pattern-driven and joining transducers define their triggers declaratively. It is also possible to declare a transducer that employs sampling.

15. $z5=a+(\text{latest } y)$ for a in x

For the purpose of (15), we assume x and y are each streams of integers. The transducer here defined is triggered by x but only samples y. This is because x appears in the triggering expression but y appears only in the dependent expression. As y is a stream of integers, its type is sequence (int), and the prefix operator latest refers to the front-most value in this sequence at the time the expression is evaluated.

In terms of a flowgraph, the transducer has two inputs: one from x and one from y. However, when input arrives from y, the value is simply cached by the transducer. The arrival of input from x will trigger the evaluation of the dependent expression, which will use the cached value of y.

The ability to distinguish declaratively between inputs which trigger a transducer and inputs which the transducer merely samples is one of the key features of this invention. It allows the definition of a transducer to remain purely declarative even when the transducer is performing an operation, like sample-caching, which involves side-effects.

Functional-Logical Optimization. We have thus far seen that the combination of logical programming (of pattern matching and joining) combined with functional programming (of dependent and filtering expressions) can express a great range of transductions in a purely declarative way. The combination style, functional-logical programming, has many of the advantages of functional programming while alleviating many of its restrictions and complications. It can express most real-world intentions without resorting to imperative programming.

The functional expressions in functional-logical programs can be optimized in the same ways that functional programs can be optimized. This sort of optimization can conflate a long chain of producers and consumers into a single transducer, making the graph simultaneously smaller and faster to execute.

In addition, the logical patterns, expressed as rules, can be combined into unified state machines. The exact nature of this optimization depends on the matching algorithm in use. In the case of TFR(1), for example, all patterns applied to a single source can be combined to form a single state machine, guaranteeing that all inputs to the stream are evaluated only once.

The ability for functional-logical declarations to express most of the useful programs for which dataflow programming is employed while retaining a wide range of opportunities for optimization is one of the key features of this invention. It allows tersely declared programs to result in smaller, faster flowgraphs.

In an implementation, a system includes: a number of agents, each connected to a sensor, where each agent receives a data (e.g., stream data) from the sensors; and a data processing component includes a data bus, connected to the agents, where the data processing component transforms streams of input into streams of output by forming a series of interconnected transductions. Each transduction can include one or more inputs, each given as a reference at least one of an external data source or a transducer; one or more outputs, each given as a reference either to at least one of an external data sink or a transducer, and for each input, a pattern to be applied to the input, to filter, collect, and organize the raw input into a more useful, partially processed form, and to remove erroneous input.

The at least one agent includes: An input queue having first memory locations in a computer memory, where an input queue stores in the first memory locations a first-in, first-out sequence of tokens to be processed and a time stamp associated with each token in the queue indicates a time when the associated token entered the input queue, and the tokens are received by the input queue over a network. A driver component, connected to the input queue, where the driver component processes the tokens in the input queue without backtracking and identifies patterns in the sequence of tokens that match one or more predetermined input patterns, and upon identifying a matched predetermined input pattern, generates an outgoing event output. An output queue, connected to the driver component, including second memory locations in the computer memory, where the output queue stores in the second memory locations a first-in, first-out sequence of the outgoing events generated by the driver component. A state table component, connected to the driver component, where the state table component stores the predetermined input patterns in a state table format. A state stack component, connected to the driver component, having third memory locations in the computer memory, where the state stack component stores in the third memory locations a last-in, first-out sequential storage of frames. A frame includes a translation state number, a symbol, and a deadline.

Each transduction can include a triggering expression that is used to determine when to evaluate a filtering expression. The triggering expression is defined as a tree of nodes, and each node is at least one of a reference to one of the inputs; a time out, which is given as an interval of time in a unit of time; a binary conjunction operator, which includes at least two children, each of which is represented by another triggering expression node; and a binary disjunction operator, which includes at least two children, each of which is represented by another triggering expression node.

Each transduction can include the filtering expression, where the filtering expression is specified in the domain of matched inputs and the filtering expression yields a Boolean result that determines when a transduction will produce outputs. An input pattern can match an input sequence of variable length, including zero length or unlimited (or an indefinitely long) length.

A result of attempting to match an input pattern to an input sequence can have at least three different states or degrees of completeness. A result of attempting to match an input pattern to an input sequence can have at least three different states. The three different states can include: until a minimum input of the input pattern has been matched, the attempt to match will be in a first state; after the minimum input has been matched and before a maximum input has been matched, the attempt to match will be in a second state; and after the maximum input has been matched, the attempt to match will be in a third state. The first state can be referred to as a "cold" state. The second state can be referred to as a "warm" state. And the third state is referred to as a "hot" state.

Data flows can be on a push basis from a sensor to an agent. The data flows can change to a pull basis by an agent from a sensor when all of the inputs of an agent are at least in the second state and when one or more of the inputs of the sensor are in the third state, and the result of a triggering expression is in the second state. An agent may accelerate its sensors that are in the second state thus forcing each such sensors to consider its pattern fully matched and thus to become in the third state and to produce its output. This effectively allows the agent to pull data from its sensors.

Definitely long or open-ended patterns are allowed to be usefully employed in transductions. One or more of the sensors can be a hardware device that transforms a physical property into a digital quantity. The digital quantity is streamed.

In another implementation, a method includes: interconnecting a number of agents and sensors, where the agents are connected to the sensors and receive streams of data from the sensors; and converting the streams of input from the sensors into streams of output via a series of interconnected transductions. Each transduction includes: one or more inputs, each given as a reference either to an external data source or a transducer; one or more outputs, each given as a reference either to an external data sink or a transducer; for each input, a pattern to be applied to the input, to filter, collect, and organize the raw input into a more useful, partially processed or matched form, and to remove erroneous input; and a triggering expression, used to determine when to evaluate a filtering expression, and defined as a tree of nodes.

Each node is at least one of: a reference to one of the inputs; a time out, given as an interval of time characterized in some convenient unit of time; a binary conjunction operator, which includes two children, each of which is another triggering expression node; or a binary disjunction operator, which includes two children, each of which is another triggering expression node. There can be a filtering expression, defined in a domain of the matched inputs and yielding a Boolean result, which determines when the transduction will produce outputs. There can be one or more expressions defined in the domain of the matched inputs and yielding results of any combination of types which produce the outputs of the transduction.

An input pattern can match an input sequence of variable length, including zero length or unlimited length, is considered a cold state until its minimum input has been matched, is considered a warm state after its minimum input has been matched and before its maximum input has been matched, and is considered a hot state after its maximum input has been matched. A completeness model of a transducer's readiness for matching is characterized by at least three different degrees, rather than two or fewer different degrees. The three-degree completeness model directly facilitates pattern-driven reactions to allow handling of variable-length patterns.

Data flows from producers to consumers are on a push basis, except when all of the inputs of an agent are at least in the warm state and when one or more of the inputs of the sensor are in the hot state, and the result of the triggering expression is in the warm state. Then the agent may accelerate its warm sensors, forcing each such sensor to consider its pattern fully matched and thus to become in the hot state and to produce its outputs. This effectively allows the sensor to pull data other producers it is connected to. This allows definitely long or open-ended patterns to be usefully employed in transductions.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A system comprising:
a plurality of agents, each coupled to a sensor, wherein each of the agents receives a data from the sensors;
a data bus, coupled to the plurality of agents; and
a data processor, coupled to the data bus, wherein the data processor transforms streams of input data into streams of output data by forming a series of interconnected transductions, each transduction comprises:
one or more inputs, each given as a reference to at least one of an external data source or a transducer,
one or more outputs, each given as a reference either to at least one of an external data sink or a transducer, and
for each input, a pattern to be applied to the input, to filter, collect, and organize the input to remove erroneous input, wherein at least one agent comprises:
an input queue comprising first memory locations in a computer memory, wherein an input queue stores in the first memory locations a first-in, first-out sequence of tokens to be processed and a time stamp associated with each token in the input queue indicates a time when the associated token entered the input queue, and the tokens are received by the input queue over a network;
a driver, coupled to the input queue, wherein the driver processes the first-in, first-out sequence of tokens in the input queue without backtracking and identifies patterns in the first-in, first-out sequence of tokens that match one or more predetermined input patterns, and upon identifying a matched predetermined input pattern, generates an outgoing event output;
an output queue, coupled to the driver, comprising second memory locations in the computer memory, wherein the output queue stores in the second memory locations a first-in, first-out sequence of the outgoing events generated by the driver;
a state table, coupled to the driver, wherein the state table stores the predetermined input patterns in a state table format; and
a state stack, coupled to the driver, comprising third memory locations in the computer memory, wherein the state stack stores in the third memory locations a last-in, first-out sequential storage of frames, and a frame comprises a translation state number, a symbol, and a deadline.

2. The system of claim 1 wherein a result of attempting to match an input pattern to an input sequence has at least three different states, the at least three different states comprising:
until a first input of the input pattern has been matched, the attempt to match will be in a first state,
after the first input has been matched and before a second input has been matched, the attempt to match will be in a second state, and
after the second input has been matched, the attempt to match will be in a third state.

3. The system of claim 2 wherein the first state is referred to as a "cold" state, the second state is referred to as a "warm" state, and the third state is referred to as a "hot" state.

4. The system of claim 2 wherein when data flows are on a push basis from a sensor to an agent, the data flows change to a pull basis by an agent from a sensor when all of the inputs of an agent are at least in the second state.

5. The system of claim 2 wherein when data flows are on a push basis from a sensor to an agent, the data flows change to a pull basis by an agent from a sensor when one or more of the inputs of the sensor are in the third state.

6. The system of claim 2 wherein when data flows are on a push basis from a sensor to an agent, the data flows change to a pull basis by an agent from a sensor when all of the inputs of an agent are at least in the second state and when one or more of the inputs of the sensor are in the third state.

7. The system of 6 wherein the result of a triggering expression is in the second state.

8. The system of claim 2 wherein an agent accelerates its sensors that are in the second state thus forcing each such sensors to consider its pattern fully matched and thus to become in the third state and to produce its output, thereby allowing the agent to pull data from its sensors.

9. The system of claim 1 wherein each transduction comprises a triggering expression that is used to determine when to evaluate a filtering expression.

10. The system of claim 9 wherein each transduction comprises the filtering expression, where the filtering expression is specified in the domain of matched inputs and the filtering expression yields a Boolean result that determines when a transduction will produce outputs.

11. The system of claim 1 wherein the triggering expression is defined as a tree of nodes, and each node is at least one of:
a reference to one of the inputs,
a time out, which is given as an interval of time in a unit of time,
a binary conjunction operator, which comprises at least two children, each of which is represented by another triggering expression node, and
a binary disjunction operator, which comprises at least two children, each of which is represented by another triggering expression node.

12. The system of claim 1 wherein an input pattern can match an input sequence of variable length.

13. The system of claim 1 wherein a result of attempting to match an input pattern to an input sequence has at least three different states.

14. The system of claim 1 wherein open-ended patterns are allowed to be usefully employed in transductions.

15. The system of claim 1 wherein at least one of the sensors is a hardware device that transforms a physical property into a digital quantity, which is streamed.

16. A method comprising:
interconnecting a plurality of agents and sensors, wherein the agents are coupled to the sensors and receive streams of input data from the sensors; and
converting the streams of input data from the sensors into streams of output data via a series of interconnected transductions, wherein each transduction comprises:
one or more inputs, each given as a reference either to an external data source or a transducer,
one or more outputs, each given as a reference either to an external data sink or a transducer,
for each input, a pattern to be applied to the input, to filter, collect, and organize the input into matched form, and to remove erroneous input, wherein at least one agent comprises:
an input queue comprising first memory locations in a computer memory, wherein an input queue stores in the first memory locations a first-in, first-out sequence of tokens to be processed and a time stamp associated with each token in the input queue indicates a time when the associated token entered the input queue, and the tokens are received by the input queue over a network;
a driver, coupled to the input queue, wherein the driver processes the tokens in the input queue without backtracking and identifies patterns in the first-in, first-out sequence of tokens that match one or more predetermined input patterns, and upon identifying a matched predetermined input pattern, generates an outgoing event output;
a triggering expression, used to determine when to evaluate a filtering expression, and defined as a tree of nodes, where each node is at least one of:
a reference to one of the inputs,
a time out, given as an interval of time characterized in some convenient unit of time,
a binary conjunction operator, which comprises two children, each of which is another triggering expression node, or
a binary disjunction operator, which comprises two children, each of which is another triggering expression node,
a filtering expression, defined in a domain of the matched inputs and yielding a Boolean result, which determines when the transduction will produce outputs, and
one or more expressions defined in the domain of the matched inputs and yielding results of any combination of types which produce the outputs of the transduction.

17. The method of claim 16 wherein at least one agent comprises:
an output queue, coupled to the driver, comprising second memory locations in the computer memory, wherein the output queue stores in the second memory locations a first-in, first-out sequence of the outgoing events generated by the driver;
a state table, coupled to the driver, wherein the state table stores the predetermined input patterns in a state table format; and
a state stack, coupled to the driver, comprising third memory locations in the computer memory, wherein the state stack stores in the third memory locations a last-in, first-out sequential storage of frames, and a frame comprises a translation state number, a symbol, and a deadline.

18. The method of claim 16 wherein a result of attempting to match an input pattern to an input sequence has at least three different states, the at least three different states comprising:
until a first input of the input pattern has been matched, the attempt to match will be in a first state,
after the first input has been matched and before a second input has been matched, the attempt to match will be in a second state, and
after the second input has been matched, the attempt to match will be in a third state.

19. The method of claim 18 wherein data flows are on a push basis from a sensor to an agent, and the data flows changes to a pull basis by an agent from a sensor when all of the inputs of an agent are at least in the second state.

20. The method of claim 18 wherein data flows are on a push basis from a sensor to an agent, and the data flows changes to a pull basis by an agent from a sensor when one or more of the inputs of the sensor are in the third state.

21. The method of claim 18 wherein data flows are on a push basis from a sensor to an agent, and the data flows changes to a pull basis by an agent from a sensor when all of the inputs of an agent are at least in the second state and when one or more of the inputs of the sensor are in the third state.

22. The method of claim 21 wherein the result of a triggering expression is in the second state.

23. The method of claim 18 wherein an agent accelerates its sensors that are in the second state thus forcing each such sensors to consider its pattern fully matched and thus to become in the third state and to produce its output, thereby allowing the agent to pull data from its sensors.

24. The method of claim 16 wherein an input pattern:
can match an input sequence of variable length,
is considered a cold state until its first input has been matched,
is considered a warm state after its first input has been matched and before its second input has been matched, and
is considered a hot state after its second input has been matched.

25. The method of claim 24 wherein data flows from producers to consumers are on a push basis, except:
when all of the inputs of an agent are at least in the warm state and when one or more of the inputs of the sensor are in the hot state, and the result of the triggering expression is in the warm state,
then the agent accelerates its warm sensors, forcing each such sensor to consider its pattern fully matched and thus to become in the hot state and to produce its outputs,
thus allowing the sensor to pull data other producers it is connected to, and
thus allowing open-ended patterns to be usefully employed in transductions.

26. The method of claim 16 wherein a completeness model of a transducer's readiness for matching is characterized by at least three different degrees, rather than two or fewer different degrees.

27. The method of claim 26 wherein the three-degree completeness model directly facilitates pattern-driven reactions to allow handling of variable-length patterns.

28. A method comprising:
interconnecting a plurality of agents and sensors, wherein the agents are coupled to the sensors and receive streams of input data from the sensors;
converting the streams of input data from the sensors into streams of output data via a series of interconnected transductions, wherein each transduction comprises:
one or more inputs, each given as a reference either to an external data source or a transducer,
one or more outputs, each given as a reference either to an external data sink or a transducer,
for each input, a pattern to be applied to the input, to filter, collect, and organize the input into a matched form, and to remove erroneous input,
a triggering expression, used to determine when to evaluate a filtering expression, and defined as a tree of nodes, where each node is at least one of:
a reference to one of the inputs,
a time out, given as an interval of time characterized in some convenient unit of time,
a binary conjunction operator, which comprises two children, each of which is another triggering expression node, or
a binary disjunction operator, which comprises two children, each of which is another triggering expression node, a filtering expression, defined in a domain of the matched inputs and yielding a Boolean result, which determines when the transduction will produce outputs, and one or more expressions defined in the domain of the matched inputs and yielding results of any combination of types which produce the outputs of the transduction, wherein a result of attempting to match an input pattern to an input sequence has at least three different states, the at least three different states comprising:

until a first input of the input pattern has been matched, the attempt to match will be in a first state, after the first input has been matched and before a second input has been matched, the attempt to match will be in a second state, and after the second input has been matched, the attempt to match will be in a third state, and at least one agent accelerates its sensors that are in the second state thus forcing each sensors to consider its pattern fully matched and thus to become in the third state and to produce its output, thereby allowing the agent to pull data from its sensors.

* * * * *